US011251905B2

(12) United States Patent
Chen et al.

(10) Patent No.: US 11,251,905 B2
(45) Date of Patent: Feb. 15, 2022

(54) METHOD FOR RECEIVING CODE BLOCK STREAM, METHOD FOR TRANSMITTING CODE BLOCK STREAM, AND COMMUNICATIONS APPARATUS

(71) Applicant: Huawei Technologies Co., Ltd., Shenzhen (CN)

(72) Inventors: Qichang Chen, Shenzhen (CN); Desheng Sun, Shenzhen (CN); Qiwen Zhong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/149,417

(22) Filed: Jan. 14, 2021

(65) Prior Publication Data
US 2021/0135786 A1 May 6, 2021

Related U.S. Application Data

(63) Continuation of application No. PCT/CN2019/099109, filed on Aug. 2, 2019.

(30) Foreign Application Priority Data

Aug. 7, 2018 (CN) .......................... 201810892856.2

(51) Int. Cl.
    *H04L 1/00* (2006.01)
(52) U.S. Cl.
    CPC ............ *H04L 1/0064* (2013.01); *H04L 1/001* (2013.01); *H04L 1/0002* (2013.01); *H04L 1/0041* (2013.01); *H04L 1/0083* (2013.01)
(58) Field of Classification Search
    CPC ..... H04L 1/001; H04L 1/0041; H04L 1/0057; H04L 1/0061; H04L 1/064; H04L 1/0083
    See application file for complete search history.

(56) References Cited

U.S. PATENT DOCUMENTS 11,082,142 B2   8/2021  Zhong
2016/0197743 A1* 7/2016 Su ..................... H04L 29/08027
                                                        370/401
(Continued)

FOREIGN PATENT DOCUMENTS

CN   101399823 A   4/2009
CN   105701053 A   6/2016
(Continued)

OTHER PUBLICATIONS

OIF Optical Internetworking Forum, Flex Ethernet Implementation Agreement, IA OIF-FLEXE-01.0, Mar. 2016, 31 pages.
(Continued)

*Primary Examiner* — Shelly A Chase
(74) *Attorney, Agent, or Firm* — Slater Matsil, LLP

(57) ABSTRACT

A method includes: determining a target code block in a code block stream that is in a first rate mode and includes a plurality of code blocks, where the target code block includes a code block of a start type in the first rate mode; modifying information carried in a code block type field of the target code block to target information, where the target information includes information carried in a code block type field of a code block of a start type in a second rate mode; or the target information includes information carried in a code block type field of a code block of a terminate type in a second rate mode; and transmitting a code block stream in the second rate mode to a transport network, where the code block stream in the second rate mode includes a modified target code block.

20 Claims, 9 Drawing Sheets

(56) References Cited

U.S. PATENT DOCUMENTS

2017/0324657 A1     11/2017  Zhong
2018/0013511 A1 *    1/2018  Hussain .............. H04J 14/0205

FOREIGN PATENT DOCUMENTS

| CN | 106130991 | A  | 11/2016 |
|----|-----------|----|---------|
| CN | 106850465 | A  | 6/2017  |
| CN | 107438029 | A  | 12/2017 |
| CN | 108243128 | A  | 7/2018  |
| WO | 2011029247 | A1 | 3/2011 |
| WO | 2016044953 | A1 | 3/2016 |
| WO | 2016144953 | A1 | 9/2016 |
| WO | 2018113329 | A1 | 6/2018 |
| WO | 2018133415 | A1 | 7/2018 |

OTHER PUBLICATIONS

OIF Optical Internetworking Forum, Flex Ethernet 2.0, Implementation Agreement, IA OIF-FLEXE-02.0, Jun. 22, 2018, 51 pages.

* cited by examiner

| Input data | Synchronization header | Code block payload | | | | | | | |
|---|---|---|---|---|---|---|---|---|---|
| Bit location / Data code block format | 01 | 2 | | | | | | | 65 |
| $D_0D_1D_2D_3/D_4D_5D_6D_7$ | 01 | $D_0$ | $D_1$ | $D_2$ | $D_3$ | $D_4$ | $D_5$ | $D_6$ | $D_7$ |
| Control code block format | | Code block type | | | | | | | |
| $C_0C_1C_2C_3/C_4C_5C_6C_7$ | 10 | 0x1e | $C_0$ | $C_1$ | $C_2$ | $C_3$ | $C_4$ | $C_5$ | $C_6$ | $C_7$ |
| $C_0C_1C_2C_3/O_4D_5D_6D_7$ | 10 | 0x2d | $C_0$ | $C_1$ | $C_2$ | $C_3$ | $O_4$ | $D_5$ | $D_6$ | $D_7$ |
| $C_0C_1C_2C_3/S_4D_5D_6D_7$ | 10 | 0x33 | $C_0$ | $C_1$ | $C_2$ | $C_3$ | | $D_5$ | $D_6$ | $D_7$ |
| $O_0D_1D_2D_3/S_4D_5D_6D_7$ | 10 | 0x66 | $D_1$ | $D_2$ | $D_3$ | $O_0$ | | $D_5$ | $D_6$ | $D_7$ |
| $O_0D_1D_2D_3/O_4D_5D_6D_7$ | 10 | 0x55 | $D_1$ | $D_2$ | $D_3$ | $O_0$ | $O_4$ | $D_5$ | $D_6$ | $D_7$ |
| $S_0D_1D_2D_3/D_4D_5D_6D_7$ | 10 | 0x78 | $D_1$ | $D_2$ | $D_3$ | $D_4$ | $D_5$ | $D_6$ | $D_7$ |
| $O_0D_1D_2D_3/C_4C_5C_6C_7$ | 10 | 0x4b | $D_1$ | $D_2$ | $D_3$ | $O_0$ | $C_4$ | $C_5$ | $C_6$ | $C_7$ |
| $T_0C_1C_2C_3/C_4C_5C_6C_7$ | 10 | 0x87 | | $C_1$ | $C_2$ | $C_3$ | $C_4$ | $C_5$ | $C_6$ | $C_7$ |
| $D_0T_1C_2C_3/C_4C_5C_6C_7$ | 10 | 0x99 | $D_0$ | | $C_2$ | $C_3$ | $C_4$ | $C_5$ | $C_6$ | $C_7$ |
| $D_0D_1T_2C_3/C_4C_5C_6C_7$ | 10 | 0xaa | $D_0$ | $D_1$ | | $C_3$ | $C_4$ | $C_5$ | $C_6$ | $C_7$ |
| $D_0D_1D_2T_3/C_4C_5C_6C_7$ | 10 | 0xb4 | $D_0$ | $D_1$ | $D_2$ | | $C_4$ | $C_5$ | $C_6$ | $C_7$ |
| $D_0D_1D_2D_3/T_4C_5C_6C_7$ | 10 | 0xcc | $D_0$ | $D_1$ | $D_2$ | $D_3$ | | $C_5$ | $C_6$ | $C_7$ |
| $D_0D_1D_2D_3/D_4T_5C_6C_7$ | 10 | 0xd2 | $D_0$ | $D_1$ | $D_2$ | $D_3$ | $D_4$ | | $C_6$ | $C_7$ |
| $D_0D_1D_2D_3/D_4D_5T_6C_7$ | 10 | 0xe1 | $D_0$ | $D_1$ | $D_2$ | $D_3$ | $D_4$ | $D_5$ | | $C_7$ |
| $D_0D_1D_2D_3/D_4D_5D_6T_7$ | 10 | 0xff | $D_0$ | $D_1$ | $D_2$ | $D_3$ | $D_4$ | $D_5$ | $D_6$ | |

FIG. 3

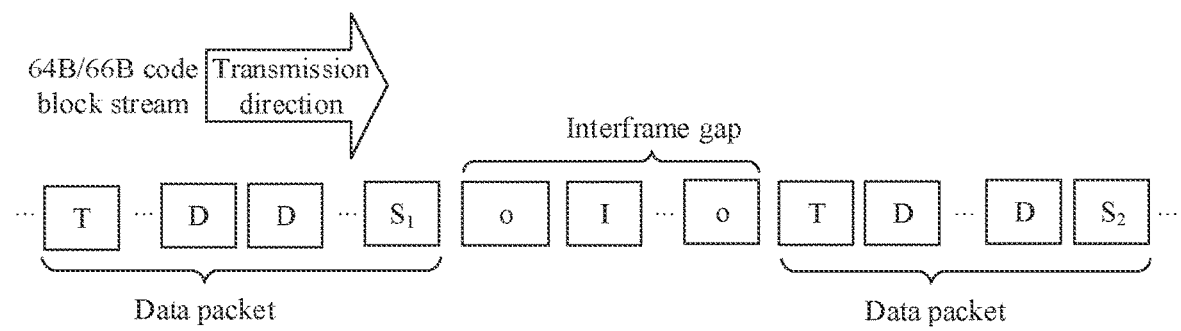

FIG. 4

| Input data | Synchronization header | Code block payload | | | | | | | |
|---|---|---|---|---|---|---|---|---|---|
| Bit location / Data code block format | 01 | 2 | | | | | | | 65 |
| $D_0D_1D_2D_3D_4D_5D_6D_7$ | 01 | $D_0$ | $D_1$ | $D_2$ | $D_3$ | $D_4$ | $D_5$ | $D_6$ | $D_7$ |
| Control code block format | | Code block type | | | | | | | |
| $C_0C_1C_2C_3C_4C_5C_6C_7$ | 10 | 0x1E | $C_0$ | $C_1$ | $C_2$ | $C_3$ | $C_4$ | $C_5$ | $C_6$ | $C_7$ |
| $S_0D_1D_2D_3D_4D_5D_6D_7$ | 10 | 0x78 | $D_1$ | $D_2$ | $D_3$ | $D_4$ | $D_5$ | $D_6$ | $D_7$ |
| $O_0D_1D_2D_3Z_4Z_5Z_6Z_7$ | 10 | 0x4B | $D_1$ | $D_2$ | $D_3$ | $O_0$ | 0x000_0000 | | |
| $T_0C_1C_2C_3C_4C_5C_6C_7$ | 10 | 0x87 | | $C_1$ | $C_2$ | $C_3$ | $C_4$ | $C_5$ | $C_6$ | $C_7$ |
| $D_0T_1C_2C_3C_4C_5C_6C_7$ | 10 | 0x99 | $D_0$ | | $C_2$ | $C_3$ | $C_4$ | $C_5$ | $C_6$ | $C_7$ |
| $D_0D_1T_2C_3C_4C_5C_6C_7$ | 10 | 0xAA | $D_0$ | $D_1$ | | $C_3$ | $C_4$ | $C_5$ | $C_6$ | $C_7$ |
| $D_0D_1D_2T_3C_4C_5C_6C_7$ | 10 | 0xB4 | $D_0$ | $D_1$ | $D_2$ | | $C_4$ | $C_5$ | $C_6$ | $C_7$ |
| $D_0D_1D_2D_3T_4C_5C_6C_7$ | 10 | 0xCC | $D_0$ | $D_1$ | $D_2$ | $D_3$ | | $C_5$ | $C_6$ | $C_7$ |
| $D_0D_1D_2D_3D_4T_5C_6C_7$ | 10 | 0xD2 | $D_0$ | $D_1$ | $D_2$ | $D_3$ | $D_4$ | | $C_6$ | $C_7$ |
| $D_0D_1D_2D_3D_4D_5T_6C_7$ | 10 | 0xE1 | $D_0$ | $D_1$ | $D_2$ | $D_3$ | $D_4$ | $D_5$ | | $C_7$ |
| $D_0D_1D_2D_3D_4D_5D_6T_7$ | 10 | 0xFF | $D_0$ | $D_1$ | $D_2$ | $D_3$ | $D_4$ | $D_5$ | $D_6$ | |

FIG. 5

METHOD FOR RECEIVING CODE BLOCK STREAM, METHOD FOR TRANSMITTING CODE BLOCK STREAM, AND COMMUNICATIONS APPARATUS

CROSS-REFERENCE TO RELATED APPLICATIONS

This application is a continuation of International Application No. PCT/CN2019/099109, filed on Aug. 2, 2019, which claims priority to Chinese Patent Application No. 201810892856.2, filed on Aug. 7, 2018. The disclosures of the aforementioned applications are hereby incorporated by reference in their entireties.

TECHNICAL FIELD

Embodiments of this application relate to the communications field, and in particular, to a method for receiving a code block stream, a method for transmitting a code block stream, and a communications apparatus.

BACKGROUND

An Ethernet technology has been applied widely in the network industry. The Ethernet technology is very popular with network manufacturers due to its simple and best effort transmission mode and standardized interworking and interconnection mechanism. Currently, the Ethernet technology is developed to a Flexible Ethernet 1.0 Implementation Agreement (FlexE for short hereinafter) based on a 100 gigabit (G) Ethernet standard. Rate aggregation of the FlexE supports a high-rate Ethernet service data stream carried over a plurality of low-rate physical interfaces. Subrates and channelization allow one Ethernet physical interface to concurrently carry a plurality of low-rate data streams. A large quantity of network devices supporting Ethernet interfaces are deployed in access and metropolitan area networks in an existing network. The FlexE interface is compatible with the standard Ethernet and extends functions and flexibility of the Ethernet, and has a great market application prospect and development space in a scenario with a determined low latency and high bandwidth such as a fronthaul, middlehaul, or backhaul network or data center interconnection in a 5th generation (5G) mobile system.

A transmission rate of the FlexE may be in units of gigabits per second (Gbps). Currently, client signals in the FlexE may include the following modes: an Ethernet physical interface mode supporting a 5 Gbps rate (5 Gbps base range, 5 GBASE-R), an Ethernet physical interface mode supporting a 10 Gbps rate (10 Gbps base range, 40 GBASE-R), and an Ethernet physical interface mode supporting a 25 Gbps rate (25 Gbps base range, n×25 GBASE-R).

The client signals need to be forwarded by an Ethernet transport network, and the Ethernet transport network may use, for example, an Ethernet physical interface mode supporting a 100 Gbps rate (100 Gbps base range, 100 GBASE-R).

Some code blocks of a start type in a mode such as 5 GBASE-R, 10 GBASE-R, or 25 GBASE-R (for example, a code block whose information carried in a code block type field is 0x33, hereinafter referred to as a 0x33 code block, or for another example, a code block whose information carried in a code block type field is 0x66, hereinafter referred to as a 0x66 code block) do not exist in the 100 GBASE-R mode. Therefore, the code block of the start type cannot be transmitted through the transport network, and accuracy of communication is affected.

SUMMARY

This application provides a method for receiving a code block stream, a method for transmitting a code block stream, and a communications apparatus to ensure transmission of a control code block and improve accuracy of communication.

According to a first aspect, a method for transmitting a code block stream is provided and includes: determining, by a transmitting device, a target code block in a code block stream that is in a first rate mode and includes a plurality of code blocks, where the target code block includes a code block of a start type in the first rate mode; modifying, by the transmitting device, information carried in a code block type field of the target code block to target information, where the target information includes information carried in a code block type field of a code block of a start type in a second rate mode; or the target information includes information carried in a code block type field of a code block of a terminate type in a second rate mode; and transmitting, by the transmitting device, a code block stream in the second rate mode to a transport network, where the code block stream in the second rate mode includes a modified target code block.

According to the solution provided by this application, the transmitting device may modify a code block of a start type in a middle or low rate mode to a code block that can be recognized by the transport network; and an end device may recognize the modified code block based on information carried in a payload field of the modified code block or a code block type of a code block after the code block. This not only can ensure that the code block of the start type in the middle or low rate mode can be transmitted by the transport network, but also can ensure that the receiving device reliably recognizes the modified code block, and further, accuracy of communication can be improved.

In this application, the code block stream in the second rate mode may be a code block stream (or a bit code block stream or a bit stream) processed (for example, encoded or decoded) at a physical coding sublayer (PCS) in an Ethernet signal (for example, a high rate Ethernet signal) transmitted in the transport network (for example, a FlexE network).

In addition, the code block stream in the first rate mode may be a code block stream (or a bit code block stream or a bit stream) processed at a PCS in an Ethernet signal (for example, a middle or low rate Ethernet signal) transmitted between a client device and a transport device (for example, an ingress device or an egress device in the transport network).

In addition, the code block stream that is in the second rate mode and is transmitted by the transmitting device may be generated by the transmitting device by performing processing such as transcoding on the code block stream in the first rate mode.

The receiving device may be an egress device of the transport network for the code block stream in the second rate mode (or an Ethernet signal including the code block stream in the second rate mode). To be specific, the Ethernet signal flows from the transport network into a destination network of the Ethernet signal (including a destination client device of the Ethernet signal) through the egress device.

The transmitting device may be an ingress device of the transport network for the code block stream in the second rate mode (or the Ethernet signal including the code block stream in the second rate mode). To be specific, the Ethernet signal flows from a source network of the Ethernet signal (including a source client device of the Ethernet signal) into the transport network through the ingress device.

In this application, a rate corresponding to the second rate mode is greater than or equal to a rate corresponding to the first rate mode.

"A rate corresponding to the second rate mode is greater than or equal to a rate corresponding to the first rate mode" may be understood as "the signal in the second rate mode as a signal in a high rate mode may be formed by aggregating one or more signals in the low rate mode that include the signal in the first rate mode".

Alternatively, "a rate corresponding to the second rate mode is greater than or equal to a rate corresponding to the first rate mode" may be understood as "a quantity of slots that can be included in the signal in the second rate mode is greater than a quantity of slots included in the signal in the first rate mode".

As an example instead of a limitation, the second rate mode may include a 40 GBASE-R mode, a 100 GBASE-R mode, a 200 GBASE-R mode, or a 400 GBASE-R mode.

Alternatively, the transport network may include an Ethernet physical link in a 40 GBASE-R mode, a 100 GBASE-R mode, a 200 GBASE-R mode, or a 400 GBASE-R mode, or the transport network may support an Ethernet physical interface mode whose rate is 40 Gbps, 100 Gbps, 200 Gbps, or 400 Gbps.

Alternatively, a transport device in the transport network forwards an Ethernet signal based on a 40 GBASE-R mode, a 100 GBASE-R mode, a 200 GBASE-R mode, or a 400 GBASE-R mode.

A transmission quantity of the code block stream in the second rate mode (or the Ethernet signal including the code block stream in the second rate mode) may be 40 Gbps, 100 Gbps, 200 Gbps, or 400 Gbps.

Alternatively, the Ethernet signal including the code block stream in the second rate mode may be an Ethernet signal in the 40 GBASE-R mode, an Ethernet signal in the 100 GBASE-R mode, an Ethernet signal in the 200 GBASE-R mode, or an Ethernet signal in the 400 GBASE-R mode.

As an example instead of a limitation, the first rate mode may include a 5 GBASE-R mode, a 10 GBASE-R mode, or a 25 GBASE-R mode.

Alternatively, a link between the client device and the ingress device or egress device of the transport network may include an Ethernet physical link in a 5 GBASE-R mode, a 10 GBASE-R mode, or a 25 GBASE-R mode, or the client device may support an Ethernet physical interface mode whose rate is 5 Gbps, 10 Gbps, or 25 Gbps.

Alternatively, an Ethernet signal is forwarded between the client device and the ingress device or egress device of the transport network based on a 5 GBASE-R mode, a 10 GBASE-R mode, or a 25 GBASE-R mode.

A transmission quantity of the code block stream in the first rate mode (or the Ethernet signal including the code block stream in the first rate mode) may be 5 Gbps, 10 Gbps, or 25 Gbps.

Alternatively, the Ethernet signal including the code block stream in the first rate mode may be a signal in the 5 GBASE-R mode, a signal in the 10 GBASE-R mode, or a signal in the 25 GBASE-R mode.

Optionally, the code block in the code block stream may be a 64-bit code block, or the code block in the code block stream may be a 66-bit code block.

The code block of the start type may also be referred to as a start (S) code block.

For example, the S code block in the first rate mode may include a code block whose information carried in a code block type field is 0x33.

For another example, the S code block in the first rate mode may include a code block whose information carried in a code block type field is 0x66.

The code block of the terminate type may also be referred to as a terminate (T) code block.

For example, the T code block (T code block in the first rate mode and T code block in the second rate mode) may include a code block whose information carried in a code block type field is at least one of the following information: 0x87, 0x99, 0xAA, 0xB4, 0xCC, 0xD2, 0xE1, and 0xFF.

"0x" is used to identify that a numeric value after "0x" is a hexadecimal numeric value. To avoid repetition, the following omits descriptions about same or similar cases.

For example, in this application, the transmitting device may modify the target code block, to modify the information carried in the code block type field of the target code block from 0x33 or 0x66 to any one of 0x87, 0x99, 0xAA, 0xB4, 0xCC, 0xD2, 0xE1, and 0xFF.

In addition, because there are a relatively large quantity of bits in a payload field of a T code block whose information carried in a code block type field is 0xFF, or a payload field of a T code block whose information carried in a code block type field is 0xFF can carry a relatively large amount of information, modifying the target code block to the T code block whose information carried in the code block type field is 0xFF can further reliably improve reliability and accuracy of transmission of the target code block.

To be specific, the transmitting device modifies the target code block, to modify the information carried in the code block type field of the target code block from 0x33 or 0x66 to 0xFF.

The T code block used as the target code block may be a T code block that is followed by a code block being a data block in the code block stream.

Specifically, an inter packet gap (IPG) exists in the code block stream. The inter packet gap may also be referred to as an interframe gap, and indicates a transmission time interval between two Ethernet data packets.

Each data packet includes a plurality of code blocks, a first code block of a data packet may be an S code block, and a last code block of a data packet may be a T code block.

To be specific, if the transmitting device modifies an S code block to a T code block, two types of T code blocks exist in the generated code block stream in the second rate mode, where the first type of T code block may be a T code block generated by modification, and the second type of T code block may be a T code block in the original code block stream (that is, the code block stream in the first rate).

Because the first type of T code block is generated by modification from the S code block, a code block after the first type of T code block is a code block of a data type. The code block of the data type may also be referred to as a data (D) code block.

In addition, because the second type of T code block is a T code block in the original code block stream, a code block after the second type of T code block is a code block of an idle type or a code block of an ordered set type. The code block of the idle type may also be referred to as an idle (idle, I) code block. The code block of the ordered set type may also be referred to as an ordered (order set, O) code block.

Therefore, the receiving device may determine, based on the type of the code block after the T code block, the S code block modified by the transmitting device.

The S code block in the second rate mode may include a code block whose information carried in a code block type field is 0x78.

For example, in this application, the transmitting device may modify the target code block, to modify the information carried in the code block type field of the target code block from 0x33 or 0x66 to 0x78.

Optionally, the method further includes: adding, by the transmitting device, first information to bits located in a first position in a payload field of the target code block, where the first information is different from second information, and the second information is information carried in bits located in the first position in a payload field of the code block of the start type in the second rate mode.

Optionally, the bits located in the first position include a $38^{th}$ bit to a $41^{st}$ bit.

The target code block includes 66 bits, which are denoted as a $0^{th}$ bit to a $65^{th}$ bit sequentially.

The payload field may include bits other than a synchronization header field and the code block type field in the 66 bits.

The payload field may include a $10^{th}$ bit to the $65^{th}$ bit in the 66 bits.

In addition, the first information and the second information may include four bits.

It should be noted that, a sequence of bits in a 64B/66B code block is determined based on a transmission sequence, and includes two synchronization header bits. To be specific, a bit that is first transmitted is a $0^{th}$ bit, and a bit that is finally transmitted is a $65^{th}$ bit.

To be specific, the $38^{th}$ bit to the $41^{st}$ bit may be the $38^{th}$ bit to the $41^{st}$ bit in a sequence counting from the initial $0^{th}$ bit.

Because the $38^{th}$ bit to the $41^{st}$ bit of the payload field in the S code block in the first rate mode are idle bits, when information is added to the bits, no additional bit overhead for determining whether the code block is modified is caused, and a length of the modified code block is not increased. Therefore, practical applicability of this application can be further improved.

In this application, the second information may include "1010".

Therefore, the first information may include a bit sequence different from that of the second information. For example, the second information may include "0011", "1100", "0101", "0110", "1111", or "0000".

The bits or bit sequence may be understood as bits or a numeric value formed by binary (0b) numeric values. To be specific, bits 0011 may also be denoted as 0b0011. To avoid repetition, the following omits descriptions about same or detailed cases.

In addition, to improve accuracy of transmission, information whose Hamming distance from the first information is 2 may be used as the first information. To be specific, "0011" or "0110" is preferentially used as the first information.

Therefore, when the target code block is modified to the code block of the start type in the second rate mode, the receiving device can easily distinguish, based on a difference between the first information and the second information, the code block of the start type that is modified by the transmitting device in the code block in the second rate.

Optionally, the first rate mode includes code blocks of at least two start types; and the adding first information to bits located in a first position in a payload field of the target code block includes: modifying, by the transmitting device, information carried in a code block type field of a target start type in the first rate mode to target first information based on a mapping relationship, where the mapping relationship is used to indicate a one-to-one mapping relationship between the at least two start types and at least two types of first information, the target start type corresponds to the target first information, and the target start type is any one of the at least two start types.

For example, first information corresponding to the S code block whose information carried in the code block type field is 0x33 may be 0011.

For another example, first information corresponding to the S code block whose information carried in the code block type field is 0x66 may be 0110.

Because the first rate mode includes two types of S code blocks that need to be modified, different first information is allocated to different S code blocks, so that the receiving device can easily determine to which S code block the target code block is modified; moreover, no additional bit overhead for distinguishing the codeword S code blocks in the first rate mode is caused, and the length of the modified code block is not increased. Therefore, practical applicability of this application can be further improved.

According to a second aspect, a method for receiving a code block stream is provided and includes: receiving, by a receiving device from a transport network, a code block stream that is in a second rate mode and includes a plurality of code blocks; determining, by the receiving device, a target code block in the code block stream in the second rate mode, where the target code block includes a first target code block, the first target code block is a code block of a start type, and information carried in a payload field of the first target code block is different from preamble information in the second rate mode; and/or the target code block includes a second target code block, the second target code block is a code block of a terminate type, and a code block after the second target code block in the code block stream in the second rate mode is a code block of a data type; and modifying, by the receiving device, the target code block, to modify the target code block to a code block of a start type in a first rate mode.

According to the solution provided by this application, a transmitting device may modify a code block of a start type in a middle or low rate mode to a code block that can be recognized by the transport network; and the end device may recognize the modified code block based on information carried in a payload field of the modified code block or a code block type of a code block after the code block. This not only can ensure that the code block of the start type in the middle or low rate mode can be transmitted by the transport network, but also can ensure that the receiving device reliably recognizes the modified code block, and further, accuracy of communication can be improved.

In this application, the code block stream in the second rate mode may be a code block stream (or a bit code block stream or a bit stream) processed (for example, encoded or decoded) at a physical coding sublayer PCS in an Ethernet signal (for example, a high rate Ethernet signal) transmitted in the transport network (for example, a FlexE network).

In addition, the code block stream in the first rate mode may be a code block stream (or a bit code block stream or a bit stream) processed at a PCS in an Ethernet signal (for example, a middle or low rate Ethernet signal) transmitted between a client device and a transport device (for example, an ingress device or an egress device in the transport network).

In addition, the code block stream that is in the second rate mode and is transmitted by the transmitting device may be generated by the transmitting device by performing processing such as transcoding on the code block stream in the first rate mode.

The receiving device may be an egress device of the transport network for the code block stream in the second rate mode (or an Ethernet signal including the code block stream in the second rate mode). To be specific, the Ethernet signal flows from the transport network into a destination network of the Ethernet signal (including a destination client device of the Ethernet signal) through the egress device.

The transmitting device may be an ingress device of the transport network for the code block stream in the second rate mode (or the Ethernet signal including the code block stream in the second rate mode). To be specific, the Ethernet signal flows from a source network of the Ethernet signal (including a source client device of the Ethernet signal) into the transport network through the ingress device.

As an example instead of a limitation, the second rate mode may include a 40 GBASE-R mode, a 100 GBASE-R mode, a 200 GBASE-R mode, or a 400 GBASE-R mode.

Alternatively, the transport network may include an Ethernet physical link in a 40 GBASE-R mode, a 100 GBASE-R mode, a 200 GBASE-R mode, or a 400 GBASE-R mode, or the transport network may support an Ethernet physical interface mode whose rate is 40 Gbps, 100 Gbps, 200 Gbps, or 400 Gbps.

Alternatively, a transport device in the transport network forwards an Ethernet signal based on a 40 GBASE-R mode, a 100 GBASE-R mode, a 200 GBASE-R mode, or a 400 GBASE-R mode.

A transmission quantity of the code block stream in the second rate mode (or the Ethernet signal including the code block stream in the second rate mode) may be 40 Gbps, 100 Gbps, 200 Gbps, or 400 Gbps.

Alternatively, the Ethernet signal including the code block stream in the second rate mode may be an Ethernet signal in the 40 GBASE-R mode, an Ethernet signal in the 100 GBASE-R mode, an Ethernet signal in the 200 GBASE-R mode, or an Ethernet signal in the 400 GBASE-R mode.

As an example instead of a limitation, the first rate mode may include a 5 GBASE-R mode, a 10 GBASE-R mode, or a 25 GBASE-R mode.

Alternatively, a link between the client device and the ingress device or egress device of the transport network may include an Ethernet physical link in a 5 GBASE-R mode, a 10 GBASE-R mode, or a 25 GBASE-R mode, or the client device may support an Ethernet physical interface mode whose rate is 5 Gbps, 10 Gbps, or 25 Gbps.

Alternatively, an Ethernet signal is forwarded between the client device and the ingress device or egress device of the transport network based on a 5 GBASE-R mode, a 10 GBASE-R mode, or a 25 GBASE-R mode.

A transmission quantity of the code block stream in the first rate mode (or the Ethernet signal including the code block stream in the first rate mode) may be 5 Gbps, 10 Gbps, or 25 Gbps.

Alternatively, the Ethernet signal including the code block stream in the first rate mode may be a signal in the 5 GBASE-R mode, a signal in the 10 GBASE-R mode, or a signal in the 25 GBASE-R mode.

Optionally, the code block in the code block stream may be a 64-bit code block, or the code block in the code block stream may be a 66-bit code block.

The code block of the start type may also be referred to as a start (S) code block.

For example, the S code block in the first rate mode may include a code block whose information carried in a code block type field is 0x33.

For another example, the S code block in the first rate mode may include a code block whose information carried in a code block type field is 0x66.

The code block of the terminate type may also be referred to as a terminate (terminated, T) code block.

For example, the T code block (T code block in the first rate mode and T code block in the second rate mode) may include a code block whose information carried in a code block type field is at least one of the following information: 0x87, 0x99, 0xAA, 0xB4, 0xCC, 0xD2, 0xE1, and 0xFF.

For example, in this application, the receiving device may modify the second target code block, to modify information carried in a code block type field of the second target code block from any one of 0x87, 0x99, 0xAA, 0xB4, 0xCC, 0xD2, 0xE1, and 0xFF to 0x33 or 0x66.

In addition, because there are a relatively large quantity of bits in a payload field of a T code block whose information carried in a code block type field is 0xFF, or a payload field of a T code block whose information carried in a code block type field is 0xFF can carry a relatively large amount of information, modifying the target code block to the T code block whose information carried in the code block type field is 0xFF can further reliably improve reliability and accuracy of transmission of the target code block.

To be specific, the transmitting device modifies the target code block, to modify the information carried in the code block type field of the target code block from 0xFF to 0x33 or 0x66.

The T code block used as the target code block may be a T code block that is followed by a code block being a data block in the code block stream.

For example, "a code block after the second target code block in the code block stream in the second rate mode is a code block of a data type" may be understood as "a first code block transmitted by the transmitting device after the second target code block is the code block of the data type".

Alternatively, "a code block after the second target code block in the code block stream in the second rate mode is a code block of a data type" may be understood as "a first code block received by the receiving device after the second target code block is the code block of the data type".

Specifically, an inter packet gap (IPG) exists in the code block stream. The inter packet gap may also be referred to as an interframe gap, and indicates a transmission time interval between two Ethernet data packets.

Each data packet includes a plurality of code blocks, a first code block of a data packet may be an S code block, and a last code block of a data packet may be a T code block.

To be specific, if the transmitting device modifies an S code block to a T code block, two types of T code blocks exist in the generated code block stream in the second rate mode, where the first type of T code block may be a T code block generated by modification, and the second type of T code block may be a T code block in the original code block stream (that is, the code block stream in the first rate).

Because the first type of T code block is generated by modification from the S code block, a code block after the first type of T code block is a code block of a data type. The code block of the data type may also be referred to as a data (D) code block.

In addition, because the second type of T code block is a T code block in the original code block stream, a code block after the second type of T code block is a code block of an idle type or a code block of an ordered set type. The code block of the idle type may also be referred to as an idle (I) code block. The code block of the ordered set type may also be referred to as an ordered (order set, O) code block.

Therefore, the receiving device may determine, based on the type of the code block after the T code block, the S code block modified by the transmitting device.

The S code block in the second rate mode may include a code block whose information carried in a code block type field is 0x78.

For example, in this application, the transmitting device may modify the target code block, to modify the information carried in the code block type field of the target code block from 0x78 to 0x33 or 0x66.

Optionally, first information is different from second information, the first information is information carried in bits located in a first position in a payload field of the target code block, and the second information is information carried in bits located in the first position in a payload field of a code block of a start type in the second rate mode.

Optionally, the bits located in the first position include a $38^{th}$ bit to a $41^{st}$ bit.

To be specific, the first information and the second information may include four bits.

It should be noted that, a sequence of bits in a 64B/66B code block is determined based on a transmission sequence, and includes two synchronization header bits. To be specific, a bit that is first transmitted is a $0^{th}$ bit, and a bit that is finally transmitted is a $65^{th}$ bit.

To be specific, the $38^{th}$ bit to the $41^{st}$ bit may be the $38^{th}$ bit to the $41^{st}$ bit in a sequence counting from the initial $0^{th}$ bit.

The target code block includes 66 bits, which are denoted as a $0^{th}$ bit to a $65^{th}$ bit in sequence.

The payload field may include bits other than a synchronization header field and the code block type field in the 66 bits.

The payload field may include a $10^{th}$ bit to the $65^{th}$ bit in the 66 bits.

Because the $38^{th}$ bit to the $41^{st}$ bit of the payload field in the S code block in the first rate mode are idle bits, when information is added to the bits, no additional bit overhead for determining whether the code block is modified is caused, and a length of the modified code block is not increased. Therefore, practical applicability of this application can be further improved.

In this application, the second information may include "1010".

Therefore, the first information may include a bit sequence different from that of the second information. For example, the second information may include "0011", "1100", "0101", "0110", "1111", or "0000".

In addition, to improve accuracy of transmission, information whose Hamming distance from the first information is 2 may be used as the first information. To be specific, "0011" or "0110" is preferentially used as the first information.

Therefore, when the target code block is modified to the code block of the start type in the second rate mode, the receiving device can easily distinguish, based on a difference between the first information and the second information, the code block of the start type that is modified by the transmitting device in the code block in the second rate.

Optionally, the first rate mode includes code blocks of at least two start types; and the modifying, by the receiving device, the target code block includes: modifying, by the receiving device based on a mapping relationship, the target code block to a code block of a target start type in the at least two start types, where the mapping relationship is used to indicate a one-to-one mapping relationship between the at least two start types and at least two types of first information, the target start type corresponds to target first information, and the target first information is the information carried in the bits located in the first position in the payload field of the target code block.

For example, first information corresponding to the S code block whose information carried in the code block type field is 0x33 may be 0011.

For another example, first information corresponding to the S code block whose information carried in the code block type field is 0x66 may be 0110.

Because the first rate mode includes two types of S code blocks that need to be modified, different first information is allocated to different S code blocks, so that the receiving device can easily determine to which S code block the target code block is modified; moreover, no additional bit overhead for distinguishing the codeword S code blocks in the first rate mode is caused, and the length of the modified code block is not increased. Therefore, practical applicability of this application can be further improved.

Optionally, the transmitting device may delete the first information from the target code block.

According to a third aspect, a communications apparatus is provided and includes a unit configured to perform each step in the method in the first aspect or the second aspect and each implementation thereof.

In a design, the communications apparatus is a communications chip, and the communications chip may include an input circuit or interface for transmitting information or data, and an output circuit or interface for receiving information or data.

In another design, the communications apparatus is a communications device (for example, an ingress device or an egress device), and the communications chip may include a transmitter configured to transmit information or data, and a receiver configured to receive information or data.

According to a fourth aspect, a communications device is provided and includes a transceiver, a processor, and a memory. The processor is configured to control the transceiver to transmit or receive a signal; the memory is configured to store a computer program; and the processor is configured to invoke and run the computer program in the memory, so that the communications device performs the method in the first aspect or any possible implementation of the first aspect.

Optionally, there are one or more processors, and there are one or more memories.

Optionally, the memory may be integrated with the processor, or the memory and the processor are disposed separately.

As an example instead of a limitation, the communications device may include an encoding device.

According to a fifth aspect, a communications device is provided and includes a transceiver, a processor, and a memory. The processor is configured to control the transceiver to transmit or receive a signal; the memory is configured to store a computer program; and the processor is configured to invoke and run the computer program in the memory, so that the communications device performs the method in the second aspect or any possible implementation of the second aspect.

Optionally, there are one or more processors, and there are one or more memories.

Optionally, the memory may be integrated with the processor, or the memory and the processor are disposed separately.

As an example instead of a limitation, the communications device may include a decoding device.

According to a sixth aspect, a processor is provided and includes an input circuit, an output circuit, and a processing circuit. The processing circuit is configured to receive a signal by using the input circuit, and transmit a signal by using the output circuit, so that the processor performs the method in the first aspect or the second aspect and any possible implementation of the first aspect or the second aspect.

In a specific implementation process, the processor may be a chip, the input circuit may be an input pin, the output circuit may be an output pin, and the processing circuit may be a transistor, a gate circuit, a trigger, various logical circuits, or the like. An input signal received by the input circuit may be received and input by a receiver that is used as an example instead of a limitation, a signal output by the output circuit may be output to a transmitter that is used as an example instead of a limitation, and transmitted by the transmitter, and the input circuit and the output circuit may be a same circuit that serves as an input circuit and an output circuit separately at different times. Specific implementations of the processor and various circuits in this embodiment of this application are not limited.

According to a seventh aspect, a processing apparatus is provided and includes a memory and a processor. The processor is configured to read an instruction stored in the memory, and may receive a signal by using a receiver, and transmit a signal by using a transmitter, to perform the method in the first aspect or the second aspect and any possible implementation of the first aspect or the second aspect.

Optionally, there are one or more processors, and there are one or more memories.

Optionally, the memory may be integrated with the processor, or the memory and the processor are disposed separately.

In a specific implementation process, the memory may be a non-transitory memory, for example, a read-only memory (ROM). The memory and the processor may be integrated on a same chip, or may be disposed on different chips separately. A type of the memory and disposition manners of the memory and the processor are not limited in this embodiment of this application.

According to an eighth aspect, a chip is provided and includes a processor and a memory, where the memory is configured to store a computer program, the processor is configured to invoke and run the computer program in the memory, and the computer program is configured to implement the method in the first aspect or the second aspect and any possible implementation of the first aspect or the second aspect.

According to a ninth aspect, a computer program product is provided, where the computer program product includes a computer program (which may also be referred to as code or an instruction); and when the computer program is run, a computer is enabled to perform the method in the first aspect or the second aspect and any possible implementation of the first aspect or the second aspect.

According to a tenth aspect, a computer-readable medium is provided, where the computer-readable medium stores a computer program (which may also be referred to as code or an instruction); and when the computer program is run on a computer, the computer is enabled to perform the method in the first aspect or the second aspect and any possible implementation of the first aspect or the second aspect.

According to the solution provided by this application, the transmitting device may modify a code block of a start type in a middle or low rate mode to a code block that can be recognized by the transport network; and the end device may recognize the modified code block based on information carried in a payload field of the modified code block or a code block type of a code block after the code block. This not only can ensure that the code block of the start type in the middle or low rate mode can be transmitted by the transport network, but also can ensure that the receiving device reliably recognizes the modified code block, and further, accuracy of communication can be improved.

BRIEF DESCRIPTION OF THE DRAWINGS

FIG. 3 is a schematic diagram of an example of a coding format used by a middle or low rate Ethernet interface;

FIG. 4 is a schematic diagram of a code stream of an Ethernet signal;

FIG. 5 is a schematic diagram of an example of a coding format used by a high rate Ethernet interface;

DETAILED DESCRIPTION OF ILLUSTRATIVE EMBODIMENTS

The following describes technical solutions of this application with reference to accompanying drawings.

Figure 1:
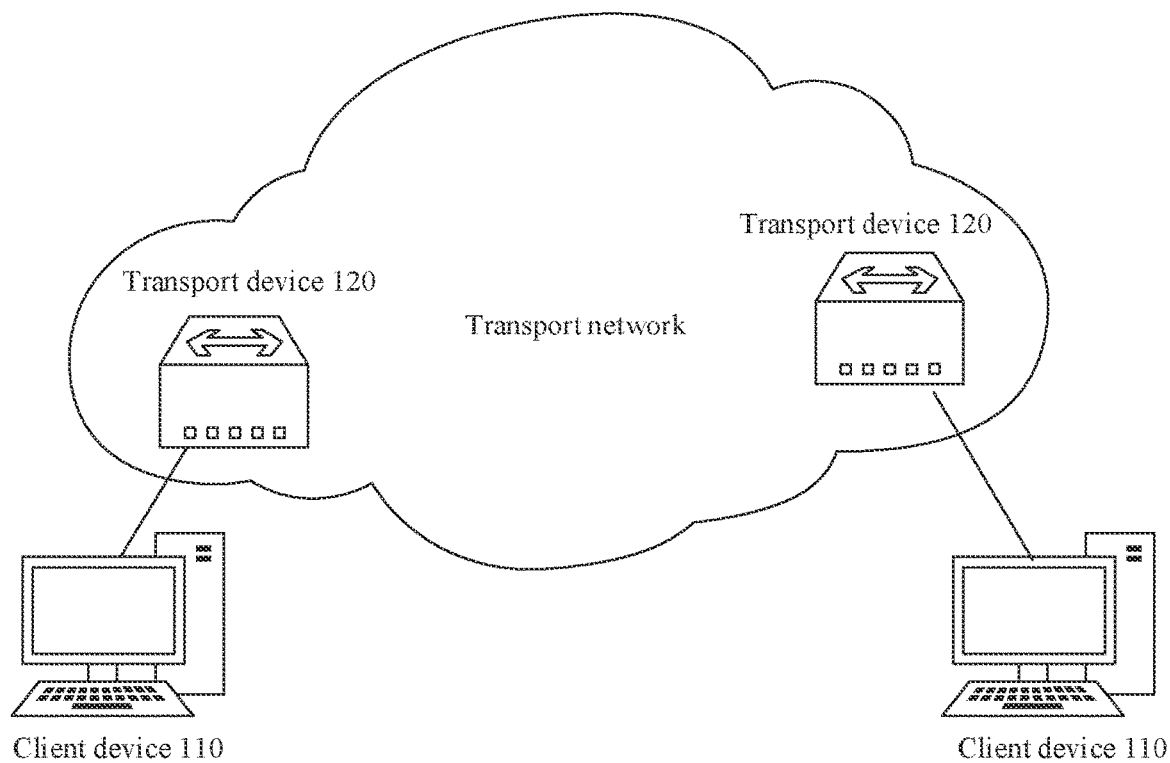
FIG. 1 is a schematic diagram of an example of a communications system according to an embodiment of this application.

FIG. 1 is a schematic diagram of an Ethernet system 100 according to this application.

In an embodiment of this application, the communications system includes at least three client devices. For example, as shown in FIG. 1, the communications system may include a plurality of client devices 110.

In addition, in this embodiment of this application, the plurality of client devices no may communicate with each other by using a transport network (which may also be referred to as a forwarding network).

As an example instead of a limitation, in this embodiment of this application, the transport network may be, for example, an optical communications network.

In this embodiment of this application, the transport network may include a plurality of transport devices 120. The transport device may also be referred to as a forwarding device.

In this application, each client device no may be communicatively connected to one or more transport devices 120.

Figure 2:
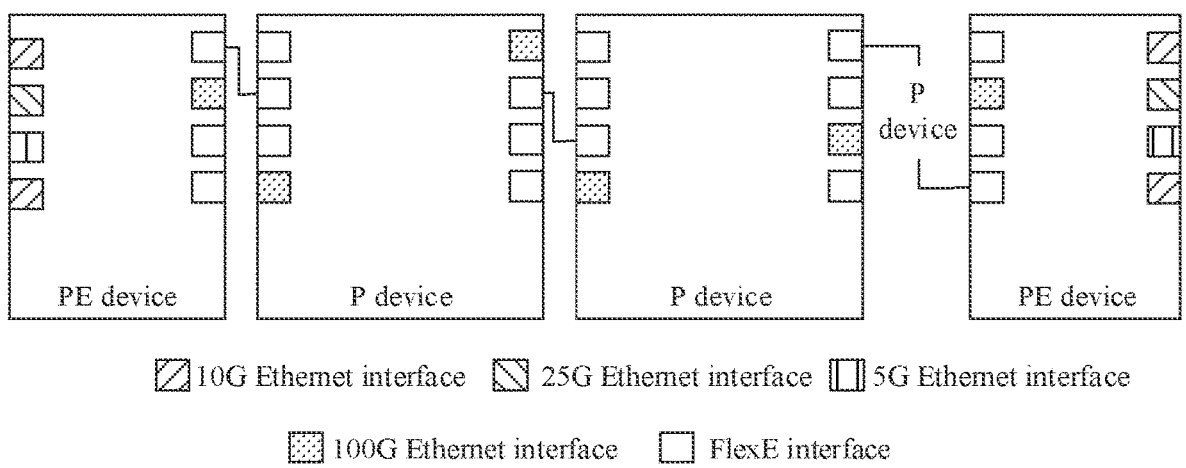
FIG. 2 is a schematic diagram of an example of a transport network according to an embodiment of this application.

FIG. 2 is a schematic structural diagram of an example of a transport network.

As shown in FIG. 2, the plurality of transport devices 120 may include a network edge (provider edge, PE) device and a network (provider, P) device.

A network-side interface (network to network interface, NNI) is configured in the P device. The NNI interface is configured to transmit data complying with a transport network communication protocol. The NNI interface may include an ordinary Ethernet interface (for example, a 100 GBASE-R mode interface), or the NNI interface may include a FlexE interface.

In addition to the NNI, a user-side interface (user network interface, UNI) is further provided in the PE device. The UNI interface is configured to transmit data between the PE device and a client device.

For an Ethernet signal, a PE device connected to a source client device of the Ethernet signal may be referred to as an ingress device (or an ingress transport device) for the Ethernet signal, and a PE device connected to a destination client device of the Ethernet signal may be referred to as an egress device (or an egress transport device) for the Ethernet signal.

When the source client device transmits a signal to the destination client device, the source client device may generate the signal, and transmit the signal to a transport device communicatively connected to the source client device, so that the transport network can route the signal (or forward) to the destination client device of the signal.

In addition, the ingress transport device for the source client device in the transport network may further perform processing on the signal (for example, forwarding processing or encapsulation processing), to convert the signal into a signal that can be transmitted in the transport network, and transmit the signal to another transport device for transmitting the signal to the destination receiving device in the transport network (for example, the egress transport device for the destination client device).

In addition, the transport device may further receive, from another transport device or client device, a signal that needs to be transmitted to a client device communicatively connected to the transport device, and may perform processing (for example, transcoding processing or decapsulation processing) on the signal, to convert the signal into a signal that can be recognized by the client device, and transmit the processed signal to the client device, so that the client device can parse the received signal to obtain data carried in the signal.

In addition, in this embodiment of this application, a signal transmitted between any two client devices may be processed and forwarded by one transport device, or may be processed and forwarded by a plurality of transport devices. This is not particularly limited in this application.

It should be understood that, quantities of client devices and transport devices shown in FIG. 1 are examples for description only, and are not particularly limited in this application.

In this embodiment of this application, the client device may be, for example, a client device such as a personal computer, and the client device can perform communication by using a medium such as an Ethernet or an optical fiber.

In this embodiment of this application, alternatively, the client device may be a network device. The network device may be a server providing various services for user equipment, for example, a software defined network (SDN) server, a world wide web server, a file transfer protocol (FTP) server, an enterprise critical application server, or another critical task server (for example, a server providing a firewall service), or a service processing board (service process unit, SPU) in the field of communications (communication technology, CT).

In this embodiment of this application, the transport device may be a device such as a gateway device, a switch, a router.

In this embodiment of this application, the client device may be a transmit end of a signal, or may be a receive end of a signal.

A client device at the transmit end may generate, based on an Ethernet protocol specification, a client Ethernet signal that can be recognized by an Ethernet device at the receive end. In addition, the client device at the transmit end may transmit the client Ethernet signal to an ingress transport device communicatively connected to the client device at the transmit end in the transport network.

The ingress transport device may encapsulate, based on the Ethernet protocol specification, the client Ethernet signal into a forwarding Ethernet signal that can be recognized by the transport device in the transport network.

The transport network routes the forwarding Ethernet signal to the egress transport device communicatively connected to the client device at the receive end.

The egress transport device may decapsulate the forwarding Ethernet signal to restore the client Ethernet signal and transmit the client Ethernet signal to the client device.

The following describes the client Ethernet signal with reference to FIG. 3.

The client Ethernet signal may be a middle or low rate Ethernet signal, or an interface mode of the client Ethernet signal may be a 5 GBASE-R mode, a 10 GBASE-R mode, or a 25 GBASE-R mode.

In addition, the middle or low rate Ethernet signal may include a middle or low rate Ethernet 64-bit (B)/66B code block.

The middle or low rate Ethernet 64B/66B code block may include a 2-bit synchronization header field (sync header field) and an 8-byte (that is, 64-bit) code block payload.

In addition, the middle or low rate Ethernet 64B/66B code block may include a data code block (data block) and a control code block (control block).

The control code block may also include a code block of an ordered set (O) type, which is referred to as an O code block for short, a code block of a start (started) type, which is referred to as an S code block for short, and a code block of a terminate (terminated) type, which is referred to as a T code block for short.

In this application, information (specifically, a 2-bit character) carried in the synchronization header field of the control code block may include 10.

In this application, the code block payload of the control code block may include a 1-byte code block type field.

To be specific, in this application, one code block may include a 2-bit synchronization header field, an 8-bit (1-byte) code block type field, and a 56-bit (7-byte) payload field.

FIG. 3 is a schematic diagram of an example of a coding format of the middle or low rate Ethernet 64B/66B code block. As shown in FIG. 3, for example, information carried in the code block type field of the S code block (specifically, a hexadecimal character) may include but is not limited to 0x33 and 0x66.

Hereinafter for ease of understanding and distinguishing, a code block whose information carried in a code block type field is 0x33 is referred to as a 0x33 code block, and a code block whose information carried in a code block type field is 0x66 is referred to as a 0x66 code block.

It should be understood that, the coding format of the middle or low rate Ethernet 64B/66B code block shown in FIG. 3 is an example for description only. However, this is not limited in this application. Other coding formats of the middle or low rate Ethernet code block in the prior art, for example, an error code block, an idle code block, and a low power idle (LPI) code block, all fall within the protection scope of this application.

In addition, a process of encoding the middle or low rate Ethernet 64B/66B code block may be performed in a physical coding sublayer (PCS) entity of the client device at the transmit end.

A physical coding sublayer is located between a reconciliation sublayer (RS) and a physical medium attachment sublayer (PMAS).

The physical coding sublayer is used to map an Ethernet MAC function that is perfectly defined to a function of an existing coding and physical layer signal system. In addition, the physical coding sublayer is used for line coding and cyclic redundancy check (CRC) check coding.

Correspondingly, a process of decoding the middle or low rate Ethernet 64B/66B code block may be performed in a physical coding sublayer entity of the client device at the receive end.

In this application, the Ethernet signal including the middle or low rate Ethernet 64B/66B code block may include a plurality of data packets.

FIG. 4 shows an example of an Ethernet code stream having the foregoing structure. As shown in FIG. 4, each data packet may include one S code block, a plurality of D code blocks, and one T code block.

The S code block is used to indicate a start of the data packet, and the T code block is used to indicate an end of the data packet.

In addition, in this application, a time interval may exist between two adjacent data packets, and the time interval may also be referred to as an inter packet gap or an interframe gap.

As shown in FIG. 4, an O code block or the like may be transmitted in the inter packet gap.

In addition, a process of encoding/decoding the client Ethernet signal may be similar to that in the prior art. Herein to avoid repetition, a detailed description thereof is omitted.

The following describes the forwarding Ethernet signal with reference to FIG. 5.

A high rate Ethernet signal transmitted in a transport network may also be referred to as a FlexE client.

The FlexE client is configured to encapsulate data of a user, and transmit the data in a data transmission mode defined by a FlexE interface, where one FlexE client may carry a data stream of one user.

Specifically, in an Ethernet system, slots may be obtained through division in time division multiplexing (TDM) mode, so that hard isolation of a transmission pipe bandwidth is implemented. One service data stream may be allocated to one or more slots, so that services of various rates are matched.

One FlexE group may include one or more bundled same-rate (for example, 100 GBASE-R, 200 GBASE-R, or 400 GBASE-R) physical link interfaces, and each FlexE group carries one or more FlexE instances.

To be specific, in this application, the forwarding Ethernet signal may be a high rate Ethernet signal, or an interface mode of the forwarding Ethernet signal may be a 100 GBASE-R mode, a 200 GBASE-R mode, or a 400 GBASE-R mode.

The FlexE instance may be a unit carrying a FlexE client, and each FlexE instance may support, for example, a 100 Gbps rate.

A slot assignment table corresponding to the FlexE group is referred to as a FlexE slot calendar, a slot mapping table corresponding to a single FlexE client is referred to as a sub slot assignment table (sub-calendar), and each slot granularity is 5 Gb or 25 Gb. A calendar of one FlexE group includes one or more sub-calendars, and each sub-calendar indicates how the slots are assigned to corresponding FlexE clients. The FlexE client represents a client data stream transmitted in a specified slot (one or more slots) in a specified FlexE instance in a FlexE group, and one FlexE group may carry a plurality of FlexE clients.

One FlexE client may correspond to one or more user service data streams (MAC Client), and a FlexE shim may provide data adaptation and conversion from the FlexE client to the MAC client.

For example, in a FlexE group spanning four physical interfaces (for example, 100 GBASE-R physical interfaces), each physical interface may have twenty 5 Gb sub slots. Therefore, the FlexE group has 20x4 sub slots (sub-calendar).

In addition, the high rate Ethernet signal may include a high rate Ethernet 64-bit (B)/66B code block.

The high rate Ethernet 64B/66B code block may include a 2-bit synchronization header field and an 8-byte code block payload.

In addition, the high rate Ethernet 64B/66B code block may include a data code block (data block) and a control code block (control block).

The control code block may also include an O code block, an S code block, and a T code block.

In this application, information (specifically, a 2-bit character) carried in the synchronization header field of the control code block may include 10.

In this application, the code block payload of the control code block may include a 1-byte code block type field.

FIG. 5 is a schematic diagram of an example of a coding format of the high rate Ethernet 64B/66B code block. As shown in FIG. 5, for example, information (specifically, a hexadecimal character) carried in the code block type field of the T code block may include but is not limited to 0xFF, and information (specifically, a hexadecimal character) carried in the code block type field of the S code block may include but is not limited to 0x78.

It should be understood that, the coding format of the high rate Ethernet 64B/66B code block shown in FIG. 5 is an example for description only. However, this is not limited in this application. Other coding formats of the middle or low rate Ethernet code block in the prior art, for example, an error code block, an idle code block, and a low power idle code block, all fall within the protection scope of this application.

In addition, a process of converting (or encapsulating) a middle or low rate Ethernet 64B/66B code block into a high rate Ethernet 64B/66B code block or a process of encapsulating a middle or low rate Ethernet signal into a high rate Ethernet signal may be performed in a physical coding sublayer entity of the ingress transport device.

Correspondingly, a process of converting (or decapsulating) a high rate Ethernet 64B/66B code block into a middle or low rate Ethernet 64B/66B code block or a process of encapsulating a high rate Ethernet signal into a middle or low rate Ethernet signal may be performed in a physical coding sublayer entity of the egress transport device.

Similar to an Ethernet signal including a middle or low rate Ethernet 64B/66B code block, in this application, the Ethernet signal including the high rate Ethernet 64B/66B code block may include a plurality of data packets.

As shown in FIG. 4, each data packet may include one S code block, a plurality of D code blocks, and one T code block.

The S code block is used to indicate a start of the data packet, and the T code block is used to indicate an end of the data packet.

In addition, in this application, a time interval may exist between two adjacent data packets, and the time interval may also be referred to as an inter packet gap or an interframe gap. As shown in FIG. 4, an O code block or the like may be transmitted in the inter packet gap.

As shown in FIG. 3 and FIG. 5, some S code blocks in the coding format of the middle or low rate Ethernet signal (or a client Ethernet signal), for example, the 0x33 code block or the 0x66 code block, do not exist in the coding format of the high rate Ethernet signal (or the forwarding Ethernet signal).

If the 0x33 code block or the 0x66 code block enters the transport network, a transmission error may occur because the transport device cannot recognize the 0x33 code block or the 0x66 code block.

Therefore, this application may use the following process to avoid a transmission error.

Figure 6:
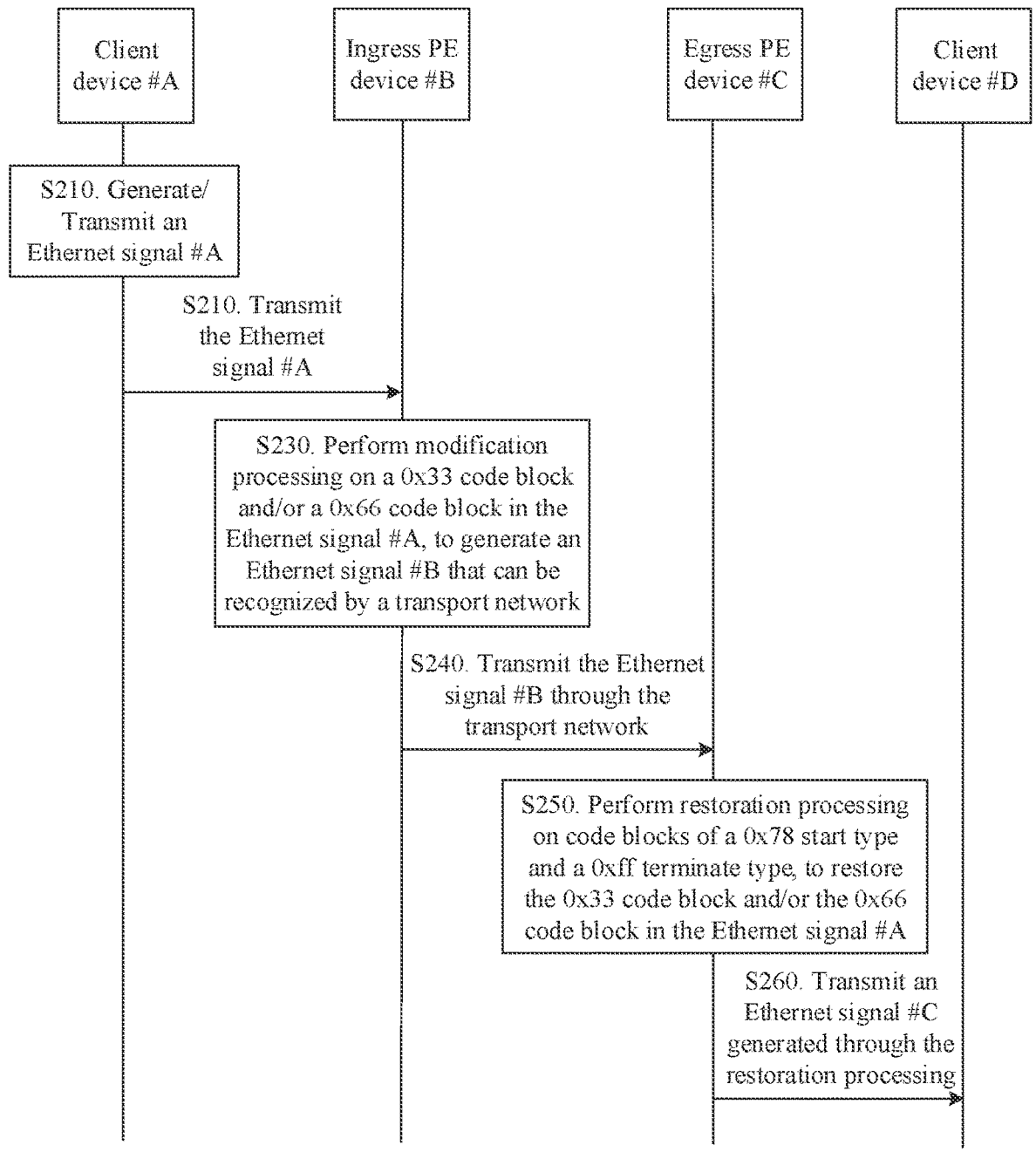
FIG. 6 is a schematic interaction diagram of an example of a process of transmitting an Ethernet signal according to an embodiment of this application.

FIG. 6 is a schematic interaction diagram of an example of a process 200 of transmitting an Ethernet signal according to this application.

As shown in FIG. 6, in S210, a client device #A may generate an Ethernet signal #A. The Ethernet signal #A may be a middle or low rate Ethernet signal. To be specific, an interface mode of the Ethernet signal #A may be a 5 GBASE-R mode, a 10 GBASE-R mode, or a 25 GBASE-R mode.

Figure 7:
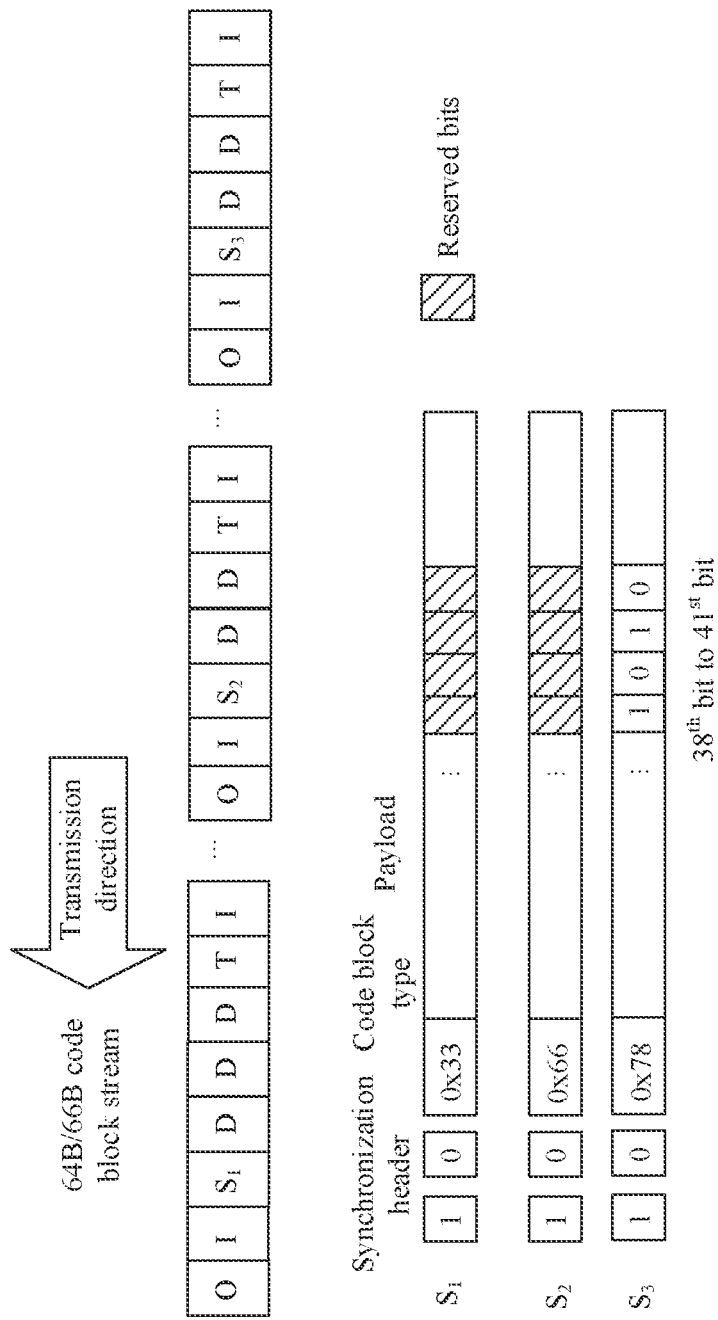
FIG. 7 is a schematic structural diagram of an example of a code block stream of a middle or low rate Ethernet signal.

FIG. 7 shows a structure example of a PCS layer code block stream of the Ethernet signal #A. As shown in FIG. 7, the PCS layer code block stream of the Ethernet signal #A may include a plurality of data packets. In addition, an inter packet gap exists between two adjacent data packets in a transmission sequence, and a code block such as an I code block (as shown by "I" in FIG. 7) or an O code block (as shown by "O" in FIG. 7) may exist in the inter packet gap.

In addition, the PCS layer code block stream of the Ethernet signal #A may include an S code block such as a 0x33 code block (as shown by "$S_1$" in FIG. 7), or a 0x66 code block (as shown by "$S_2$" in FIG. 7).

It should be noted that, the structure of the code block stream shown in FIG. 7 is an example for description only. This application is not limited thereto.

In addition, because a 0x78 code block (as shown by "$S_3$" in FIG. 7) exists in both a middle or low rate Ethernet signal and a high rate Ethernet signal, code blocks that need to be modified in this application do not include the 0x78 code block.

In addition, a process of generating the Ethernet signal #A may be similar to that in the prior art. Herein to avoid repetition, a detailed description thereof is omitted.

In S220, the client device #A may transmit the Ethernet signal #A to a PE device communicatively connected to the client device #A. Hereinafter for ease of understanding and distinguishing, the PE device is denoted as an ingress PE device #B.

In S230, the ingress PE device #B may modify the Ethernet signal #A, to convert a code block (that is, a 0x33 code block and/or a 0x66 code block) that cannot be recognized by a transport network (specifically, each transport device) into a code block that can be recognized by the transport network.

As an instance instead of a limitation, in this application, the following modification manners may be illustrated.

Manner 1

Figure 8:
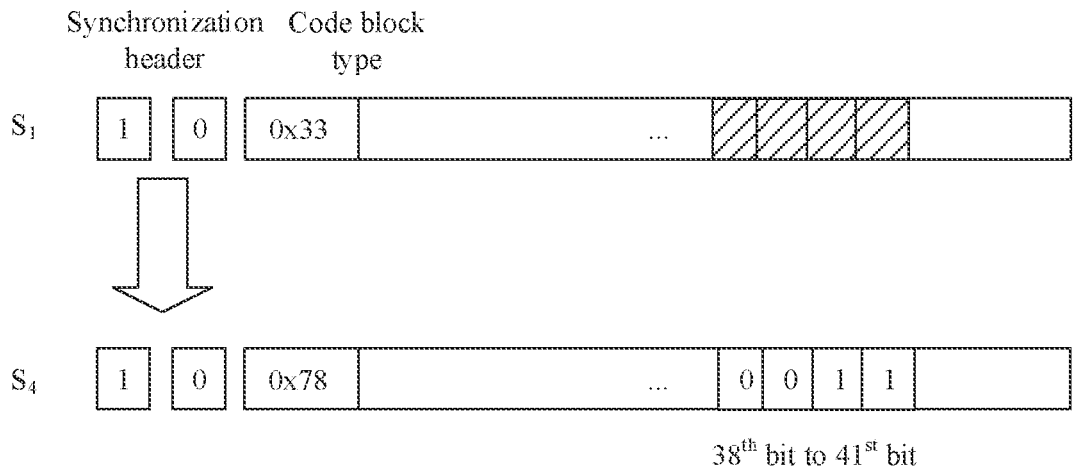
FIG. 8 is a schematic diagram of an example of a change of a 0x33 code block in a modification process according to an embodiment of this application.

FIG. 8 shows an example of a change of a 0x33 code block in a modification process in the manner 1. As shown in FIG. 8, when the PCS layer code block stream of the Ethernet signal #A includes the 0x33 code block, the ingress PE device #B may modify the 0x33 code block to an S code block in a high rate mode (for example, a code block shown by "$S_4$" in FIG. 8).

Specifically, the ingress PE device #B may modify information carried in a code block type field of the 0x33 code block from information (for example, "0x33") corresponding to the 0x33 code block to information (for example, "0x78") corresponding to the S code block in the high rate mode.

Figure 9:
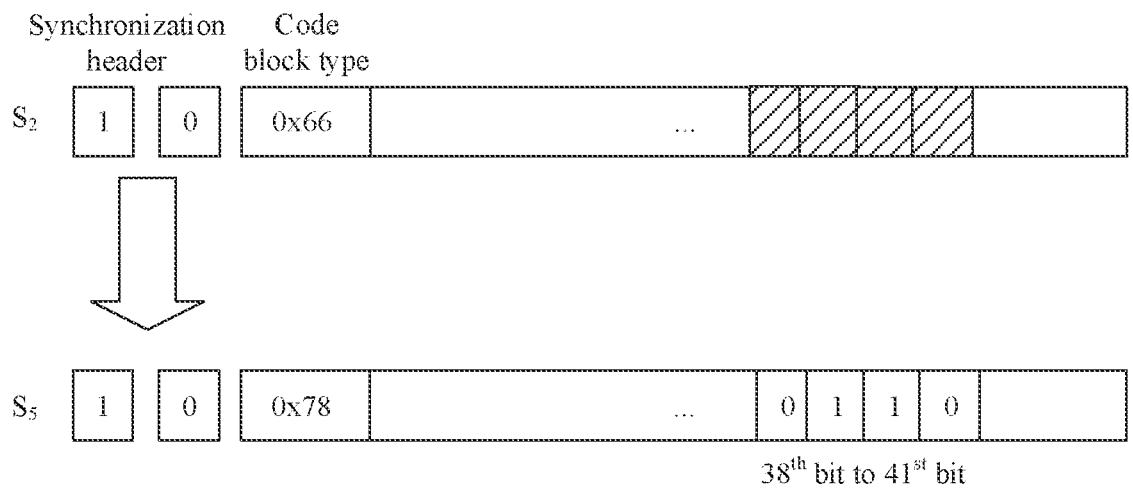
FIG. 9 is a schematic diagram of an example of a change of a 0x66 code block in a modification process according to an embodiment of this application.

FIG. 9 shows an example of a change of a 0x66 code block in a modification process in the manner 1. As shown in FIG. 9, when the PCS layer code block stream of the Ethernet signal #A includes the 0x66 code block, the ingress PE device #B may modify the 0x66 code block to an S code block in a high rate mode (for example, a code block shown by "$S_5$" in FIG. 9).

Specifically, the ingress PE device #B may modify information carried in a code block type field of the 0x66 code block from information (for example, "0x66") corresponding to the 0x66 code block to information (for example, "0x78") corresponding to the S code block in the high rate mode.

It should be noted that, a 0x78 code block may exist in the PCS layer code block stream of the Ethernet signal #A in actual transmission.

To be specific, in this application, a 0x78 code block (denoted as a 0x78 code block #1) that is generated by modification and an original existing 0x78 code block (denoted as a 0x78 code block #2) may exist in the modified code block stream of the PCS layer.

Consequently, in this case, a receiving device possibly cannot distinguish whether a 0x78 code block is the 0x78 code block #1 or the 0x78 code block #2, further resulting in a transmission error.

Therefore, in this application, any one of the following processing manners may be used.

Processing Manner a

In this application, a $38^{th}$ bit to a $41^{st}$ bit of the 0x78 code block #1 (or the 0x33 code block or the 0x66 code block) are reserved bits. To be specific, the reserved bits do not carry information.

Correspondingly, a $38^{th}$ bit to a $41^{st}$ bit of the 0x78 code block #2 carry specified information, for example, "1010".

Therefore, in this application, the receiving device may determine, based on whether the $38^{th}$ bit to the $41^{st}$ bit of the 0x78 code block carry information (for example, bits), whether the 0x78 code block is the 0x78 code block #1 or the 0x78 code block #2.

To be specific, if the $38^{th}$ bit to the $41^{st}$ bit of the 0x78 code block do not carry information, the receiving device may determine the 0x78 code block as the 0x78 code block #1.

If the $38^{th}$ bit to the $41^{st}$ bit of the 0x78 code block carry information, the receiving device may determine the 0x78 code block as the 0x78 code block #2.

Processing Manner b

In this application, the transmitting device may add a distinguishing identifier to a payload field of the 0x78 code block #1.

The distinguishing identifier may be used to indicate that the 0x78 code block carrying the distinguishing identifier is the 0x78 code block #1.

Therefore, the receiving device may determine, based on whether the 0x78 code block carries the distinguishing identifier, whether the 0x78 code block is the 0x78 code block #1 or the 0x78 code block #2.

In addition, in this application, a $38^{th}$ bit to a $41^{st}$ bit of the 0x78 code block #1 (or the 0x33 code block or the 0x66 code block) are reserved bits. To be specific, the reserved bits do not carry information.

Therefore, the transmitting device may add the distinguishing identifier to the reserved bits.

It should be noted that, a $38^{th}$ bit to a $41^{st}$ bit of the 0x78 code block #2 carry specified information, for example, "1010".

Therefore, in this application, the distinguishing identifier may be different from the specified information (for example, "1010"). Therefore, it can be ensured that the receiving device can reliably distinguish whether a 0x78 code block is the 0x78 code block #1 or the 0x78 code block #2.

As an example instead of a limitation, the distinguishing identifier may include but is not limited to the following bit sequences:

0000, 0001, 0010, 0101, 0011, 0100, 0110, 0111, 1000, 1001, 1011, 1100, 1101, and 1111.

It should be understood that, the foregoing illustrated distinguishing identifier is an example for description only. This application is not limited thereto, as long as it is ensured that a bit sequence of the distinguishing identifier is different from information (for example, "1010") carried in the $38^{th}$ bit to the $41^{st}$ bit of the 0x78 code block in the high rate mode.

In addition, a bit error rate may exist in communication, and this may cause a transmission error to the distinguishing identifier, and further cause errored identifier information to be the same as the specified information.

Therefore, this application may enable a Hamming distance between the distinguishing identifier and the specified information to be greater than or equal to a preset value (for example, 2).

Figure 10:
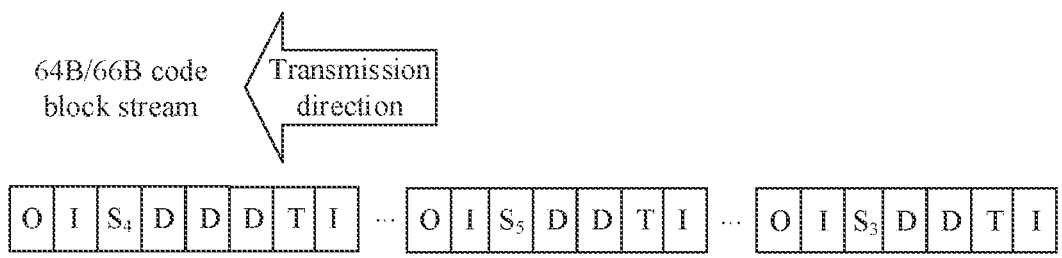
FIG. 10 is a schematic structural diagram of an example of a modified code block stream.

FIG. 10 is a schematic diagram of a form of the code block stream shown in FIG. 7 and modified in the manner 1.

Manner 2

Figure 11:
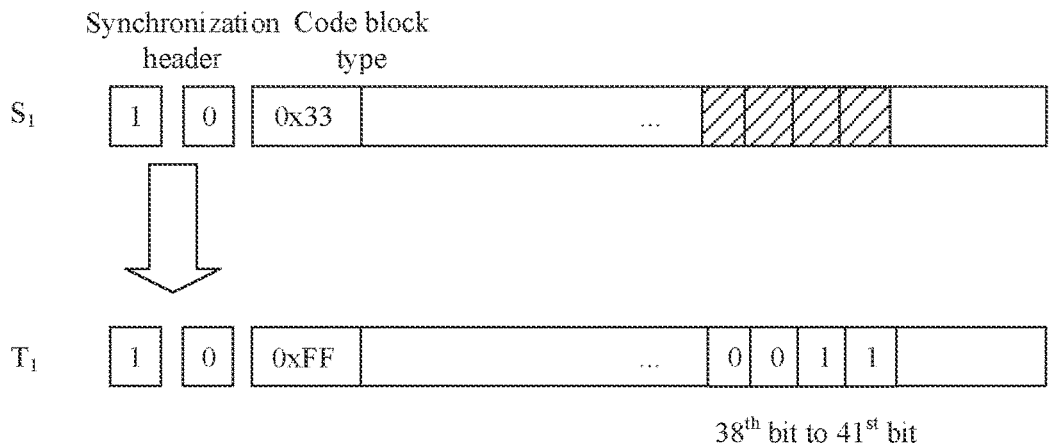
FIG. 11 is a schematic diagram of another example of a change of a 0x33 code block in a modification process according to an embodiment of this application.

FIG. 11 shows an example of a change of a 0x33 code block in a modification process in the manner 2. As shown in FIG. 11, when the PCS layer code block stream of the Ethernet signal #A includes the 0x33 code block, the ingress PE device #B may modify the 0x33 code block to a T code block (for example, a code block shown by "$T_1$" in FIG. 11).

Specifically, the ingress PE device #B may modify information carried in a code block type field of the 0x33 code block from information (for example, "0x33") corresponding to the 0x33 code block to information (for example, any one of "0x87", "0x99", "0xAA", "0xB4", "0xCC", "0xD2", "0xE1", and "0xFF") corresponding to the T code block.

Figure 12:
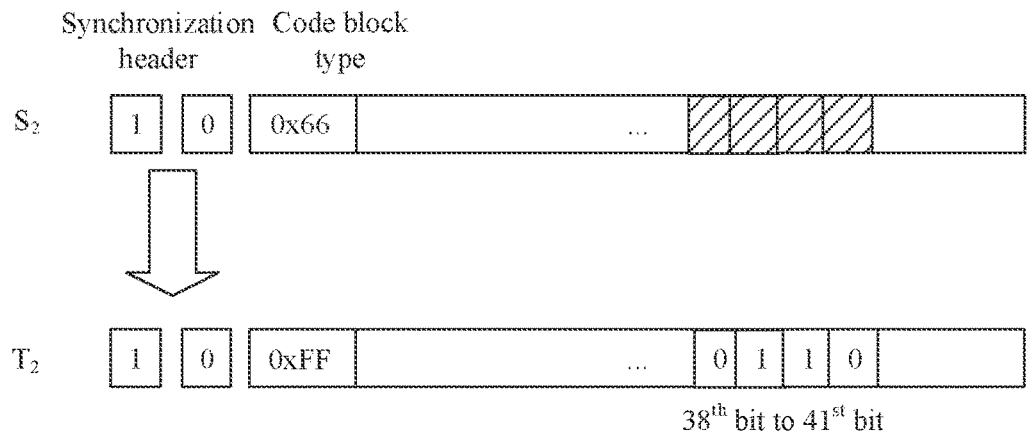
FIG. 12 is a schematic diagram of another example of a change of a 0x66 code block in a modification process according to an embodiment of this application.

FIG. 12 shows an example of a change of a 0x66 code block in a modification process in the manner 2. As shown in FIG. 12, when the PCS layer code block stream of the Ethernet signal #A includes the 0x66 code block, the ingress PE device #B may modify the 0x66 code block to a T code block (for example, a code block shown by "$T_2$" in FIG. 12).

Specifically, the ingress PE device #B may modify information carried in a code block type field of the 0x66 code block from information (for example, "0x66") corresponding to the 0x66 code block to information (for example, any one of "0x87", "0x99", "0xAA", "0xB4", "0xCC", "0xD2", "0xE1", and "0xFF") corresponding to the T code block.

Figure 13:
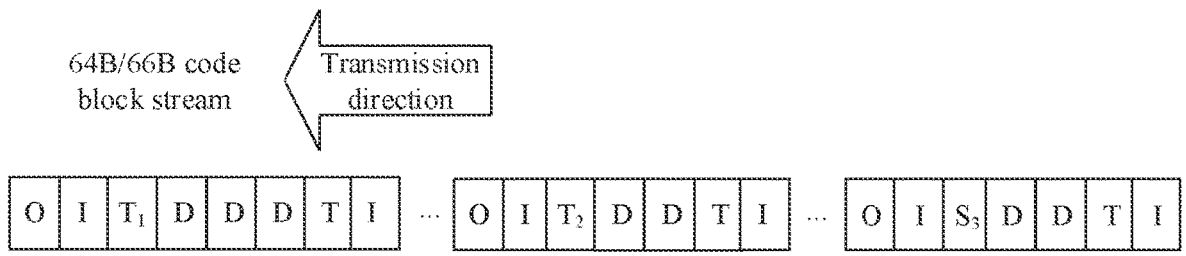
FIG. 13 is a schematic structural diagram of another example of a modified code block stream.

FIG. 13 is a schematic diagram of a form of the code block stream shown in FIG. 7 and modified in the manner 2.

Manner 3

When the PCS layer code block stream of the Ethernet signal #A includes the 0x33 code block, the ingress PE device #B may modify the 0x33 code block to an S code block.

When the PCS layer code block stream of the Ethernet signal #A includes the 0x66 code block, the ingress PE device #B may modify the 0x66 code block to a T code block.

Manner 4

When the PCS layer code block stream of the Ethernet signal #A includes the 0x33 code block, the ingress PE device #B may modify the 0x33 code block to a T code block.

When the PCS layer code block stream of the Ethernet signal #A includes the 0x66 code block, the ingress PE device #B may modify the 0x66 code block to an S code block.

In the manner 3 and the manner 4, a modification process of each code block may be similar to the process described in the manner 1 or the manner 2. Herein to avoid repetition, a detailed description thereof is omitted.

It should be noted that, in this application, because an egress PE device #C needs to restore the modified code block, a restoration manner used by the egress PE device #C needs to correspond to the modification manner used by the ingress PE device #B (for example, the restoration manner and the modification manner are mutually inverse processing), to ensure accuracy of restoration.

As an instance instead of a limitation, in this application, the modification manner used by the ingress PE device #B may be pre-specified by a communications system or a communication protocol, or the modification manner used by the ingress PE device #B may be determined by the egress PE device #C and the ingress PE device #B through negotiation, or the modification manner used by the ingress PE device #B may be determined by a management device of the transport network and delivered to the ingress PE device #B; in addition, the management device may deliver, to the egress PE device #C, the restoration manner corresponding to the modification manner.

It should be noted that, because the 0x33 code block and the 0x66 code block may coexist in the Ethernet signal in actual transmission, in this case, if information carried in code block type fields of the 0x33 code block and the 0x66 code block is modified to information corresponding to a same code block (an S code block or a T code block, denoted as a code block #1), the egress PE device possibly cannot determine whether the code block #1 in the received Ethernet signal should be restored to the 0x33 code block or the 0x66 code block. The egress PE device may be a PE device communicatively connected to the destination client device of the Ethernet signal #A. Hereinafter for ease of understanding and distinguishing, the PE device is denoted as the egress PE device #C.

Therefore, in this application, any one of the following processing manners may be used.

Processing Manner 1

The processing manner 1 may be used in combination with the processing manner b.

Optionally, a mapping relationship #A may be prestored in the egress PE device #C and the ingress PE device #B.

The mapping relationship #A may be used to indicate a correspondence between the 0x33 code block and a T code block (denoted as a T code block #a), and the mapping relationship #A may be used to indicate a correspondence between 0x66 and another T code block (denoted as a T code block #b).

To be specific, the ingress PE device #B may modify, based on the indication of the mapping relationship #A, information carried in the code block type field of the 0x33 code block from the information (for example, "0x33") corresponding to the 0x33 code block to information corresponding to a code block type field of the T code block #a.

In addition, the ingress PE device #B may modify, based on the indication of the mapping relationship #A, information carried in the code block type field of the 0x66 code block from the information (for example, "0x66") corresponding to the 0x66 code block to information corresponding to a code block type field of the T code block #b.

As an instance instead of a limitation, the T code block #a may be a T6 code block. To be specific, the T code block #a may be information "0xE1" corresponding to the code block type field.

As an instance instead of a limitation, the T code block #b may be a T7 code block. To be specific, the T code block #b may be information "0xFF" corresponding to the code block type field.

Because the T6 and T7 code blocks include a large quantity of bytes that may be used to carry data, it can be ensured that information of the modified code blocks is not lost, and an effect of this application is further improved.

It should be understood that, the foregoing illustrated specific instances of the T code block #a and the T code block #b are examples for description only. This application is not limited thereto. The T code block #a and the T code block #b may be any code block in T0 to T7, as long as it is ensured that the T code block #a and the T code block #b are different.

It should be noted that, the mapping relationship #A may be determined by the management device of the transport network and delivered to each transport device, or the mapping relationship #A may be pre-specified by the communications system or the communication protocol, or the mapping relationship #A may be determined by the ingress PE and the egress PE through negotiation, or the mapping relationship #A may be input by a user or an administrator to the ingress PE and the egress PE, or the mapping relationship #A may be configured by a manufacturer or an operator in the ingress PE and the egress PE. This is not particularly limited.

Processing Manner 2

The processing manner 2 may be used in combination with the processing manner b or the processing manner a.

Optionally, a mapping relationship #B may be prestored in the egress PE device #C and the ingress PE device #B.

The mapping relationship #B may be used to indicate a correspondence between the 0x33 code block and a distinguishing identifier (denoted as a distinguishing identifier #a), and the mapping relationship #B may be used to indicate a correspondence between 0x66 and another distinguishing identifier (denoted as a distinguishing identifier #b).

As shown in FIG. 8 to FIG. 12, when modifying the 0x33 code block based on the indication of the mapping relationship #B, the ingress PE device #B may add the distinguishing identifier #a to a specified position in a payload field of the 0x33 code block.

In addition, when modifying the 0x66 code block based on the indication of the mapping relationship #B, the ingress PE device #B may add the distinguishing identifier #b to the specified position in the payload field of the 0x33 code block.

As an instance instead of a limitation, the distinguishing identifier #a is "0011".

As an instance instead of a limitation, the distinguishing identifier #a is "0110".

It should be understood that, the foregoing illustrated specific instances of the distinguishing identifier #a and the distinguishing identifier #b are examples for description only. This application is not limited thereto, as long as it is ensured that the distinguishing identifier #a and the distinguishing identifier #b are different.

It should be noted that, the mapping relationship #B may be determined by the management device of the transport network and delivered to each transport device, or the mapping relationship #B may be pre-specified by the communications system or the communication protocol, or the mapping relationship #B may be determined by the ingress PE and the egress PE through negotiation, or the mapping relationship #B may be input by a user or an administrator to the ingress PE and the egress PE, or the mapping relationship #B may be configured by a manufacturer or an operator in the ingress PE and the egress PE. This is not particularly limited.

It should be noted that, in this application, because the egress PE device #C needs to restore the modified code block, the restoration manner used by the egress PE device #C needs to correspond to the processing manner (that is, the processing manner 1 or the processing manner 2) used by the ingress PE device #B (for example, the restoration manner and the processing manner are mutually inverse processing), to ensure accuracy of restoration.

As an instance instead of a limitation, in this application, the processing manner used by the ingress PE device #B may be pre-specified by the communications system or the communication protocol, or the processing manner used by the ingress PE device #B may be determined by the egress PE device #C and the ingress PE device #B through negotiation, or the processing manner used by the ingress PE device #B may be determined by the management device of the transport network and delivered to the ingress PE device #B; in addition, the management device may deliver, to the egress PE device #C, the restoration manner corresponding to the modification manner.

In addition, in S240, the ingress PE device #B may generate, based on the modified Ethernet signal #A, a high rate Ethernet signal (for example, an Ethernet signal supported by the FlexE client) transmitted in the transport network. Hereinafter, for ease of understanding and description, the Ethernet signal is referred to as an Ethernet signal #B. In addition, the ingress PE device #B may transmit the Ethernet signal #B to the egress PE device #C through the transport network. The process may be similar to that in the prior art. Herein to avoid repetition, a detailed description thereof is omitted.

In S250, the egress PE device #C may determine, in a PCS layer code block stream of the Ethernet signal #B, a code block modified by the ingress PE device #B. Hereinafter, for ease of understanding and distinguishing, the code block is denoted as a code block #A. In addition, the egress PE device #C may restore the code block #A to a previously modified code block.

As an example instead of a limitation, in this application, the egress PE device #C may determine a code block meeting any one of the following conditions as the code block #A.

Condition 1

If a code block is an S code block, and information (denoted as information #1) carried in a payload field of the S code block is different from information (that is, a preamble) that should be carried in the payload field of the S code block in the high rate mode as specified by the communications system or the communication protocol, the egress PE device #C may determine the S code block as the code block #A.

As an example instead of a limitation, the information #1 may include 64 (that is, a quantity of bits included in the payload field of the S code block) bits.

For example, a position (for example, a $38^{th}$ bit to a $41^{st}$ bit) specified by the 64 bits is null (that is, not carrying bits).

For another example, the distinguishing identifier may be added by the ingress PE device #B to the information #1.

To be specific, information (for example, 0011 or on0) carried in the position (for example, the $38^{th}$ bit to the $41^{st}$ bit) specified in the 64 bits may correspond to the information (that is, 1010) carried in the position (for example, the $38^{th}$ bit to the $41^{st}$ bit) specified in the preamble (including 64 bits).

Specifically, when the ingress PE device #B modifies the 0x33 code block or the 0x66 code block in the manner 1, the 0x33 code block or the 0x66 code block is modified to the S code block. However, because the information carried in the payload field of the 0x33 code block or the 0x66 code block modified in the foregoing manner 1 is different from the information (that is, the preamble) that should be carried in the payload field of the S code block in the high rate mode as specified by the communications system or the communication protocol, the egress PE device #C may determine the code block meeting the foregoing condition 1 as the code block modified by the ingress PE device #B.

Therefore, the egress PE device #C may modify the code block #A to an S code block in a middle or low rate mode. Specifically, the egress PE device #C may modify information carried in a code block type field of the code block #A from 0x78 to 0x33 or 0x66.

In addition, the egress PE device #C may delete a distinguishing identifier carried in a payload field of the code block #A.

Condition 2

If a code block is a T code block, and a first code block after the T code block in the PCS layer code block stream of the Ethernet signal #B is a D code block, the egress PE device #C may determine the T code block as the code block #A.

Specifically, when the ingress PE device #B modifies the 0x33 code block or the 0x66 code block in the foregoing manner 2, the 0x33 code block or the 0x66 code block is modified to a T code block. However, the 0x33 code block or the 0x66 code block modified in the foregoing manner 2 is located in a start position of a data packet in the code block stream, and the first code block after the 0x33 code block or the 0x66 code block is D. However, in the code block stream, another T code block than the T code block generated by modification is located in an end position of the data packet. To be specific, an inter packet gap exists after the another T code block, but the D code block cannot be transmitted within the inter packet gap. Therefore, the egress PE device #C may determine a code block meeting the condition 2 as the code block (that is, the code block #A) modified by the ingress PE device #B.

Therefore, the egress PE device #C may modify the code block #A to an S code block in a middle or low rate mode. Specifically, the egress PE device #C may modify information (for example, from 0xFF) carried in a code block type field of the code block #A to 0x33 or 0x66.

It should be noted that, because the 0x33 code block and the 0x66 code block may coexist in the Ethernet signal in actual transmission, in this case, the information carried in the code block type fields of the 0x33 code block and the 0x66 code block may be modified to information corresponding to a same type of code block (S code block or T code block). Therefore, the egress PE device #C needs to determine whether the code block is restored to the 0x33 code block or the 0x66 code block.

Therefore, in this application, the egress PE device #C may use any one of the following processing manners.

Processing Manner a

The processing manner a may correspond to the processing manner 1.

Optionally, a mapping relationship #A may be prestored in the egress PE device #C and the ingress PE device #B.

The mapping relationship #A may be used to indicate a correspondence between the 0x33 code block and a T code block (denoted as a T code block #a), and the mapping relationship #A may be used to indicate a correspondence between 0x66 and another T code block (denoted as a T code block #b).

To be specific, the ingress PE device #B may modify, based on the indication of the mapping relationship #A, information carried in the code block type field of the 0x33 code block from the information (for example, "0x33") corresponding to the 0x33 code block to information corresponding to a code block type field of the T code block #a.

Therefore, the egress PE device #C may modify, based on the indication of the mapping relationship #A, the information carried in the code block type field of the T code block #a meeting the foregoing condition 2, to the information (for example, "0x33") corresponding to the 0x33 code block.

In addition, the ingress PE device #B may modify, based on the indication of the mapping relationship #A, information carried in the code block type field of the 0x66 code block from the information (for example, "0x66") corresponding to the 0x66 code block to information corresponding to a code block type field of the T code block #b.

Therefore, the egress PE device #C may modify, based on the indication of the mapping relationship #A, the information carried in the code block type field of the T code block #b meeting the foregoing condition 2, to the information (for example, "0x66") corresponding to the 0x66 code block.

As an instance instead of a limitation, the T code block #a may be a T6 code block. To be specific, the T code block #a may be information "0xE1" corresponding to the code block type field.

As an instance instead of a limitation, the T code block #b may be a T7 code block. To be specific, the T code block #b may be information "0xFF" corresponding to the code block type field.

Because the T6 and T7 code blocks include a large quantity of bytes that may be used to carry data, it can be ensured that information of the modified code blocks is not lost, and an effect of this application is further improved.

It should be understood that, the foregoing illustrated specific instances of the T code block #a and the T code block #b are examples for description only. This application is not limited thereto. The T code block #a and the T code block #b may be any code block in T0 to T7, as long as it is ensured that the T code block #a and the T code block #b are different.

It should be noted that, the mapping relationship #A may be determined by the management device of the transport network and delivered to each transport device, or the mapping relationship #A may be pre-specified by the communications system or the communication protocol, or the mapping relationship #A may be determined by the ingress PE and the egress PE through negotiation, or the mapping relationship #A may be input by the user or the administrator to the ingress PE and the egress PE, or the mapping relationship #A may be configured by the manufacturer or the operator in the ingress PE and the egress PE. This is not particularly limited.

Processing Manner b

The processing manner b may correspond to the processing manner 2.

Optionally, a mapping relationship #B may be prestored in the egress PE device #C and the ingress PE device #B.

The mapping relationship #B may be used to indicate a correspondence between the 0x33 code block and a distinguishing identifier (denoted as a distinguishing identifier #a), and the mapping relationship #B may be used to indicate a correspondence between 0x66 and another distinguishing identifier (denoted as a distinguishing identifier #b).

As shown in FIG. 8 to FIG. 12, when modifying the 0x33 code block based on the indication of the mapping relationship #B, the ingress PE device #B may add the distinguishing identifier #a to a specified position in a payload field of the 0x33 code block.

In addition, when modifying the 0x66 code block based on the indication of the mapping relationship #B, the ingress PE device #B may add the distinguishing identifier #b to the specified position in the payload field of the 0x33 code block.

As an instance instead of a limitation, the distinguishing identifier #a is "0011".

As an instance instead of a limitation, the distinguishing identifier #a is "0110".

It should be understood that, the foregoing illustrated specific instances of the distinguishing identifier #a and the distinguishing identifier #b are examples for description only. This application is not limited thereto, as long as it is ensured that the distinguishing identifier #a and the distinguishing identifier #b are different.

Therefore, the egress PE device #C may modify, based on the indication of the mapping relationship #B, the information carried in the code block type field of the code block meeting the foregoing condition 1 or condition 2 and carrying the distinguishing identifier #a, to the information (for example, "0x33") corresponding to the 0x33 code block.

In addition, the egress PE device #C may modify, based on the indication of the mapping relationship #B, the information carried in the code block type field of the code block meeting the foregoing condition 1 or condition 2 and carrying the distinguishing identifier #b, to the information (for example, "0x66") corresponding to the 0x66 code block.

In addition, the egress PE device #C may delete the distinguishing identifier carried in the payload field of the code block #A.

It should be noted that, the mapping relationship #B may be determined by the management device of the transport network and delivered to each transport device, or the mapping relationship #B may be pre-specified by the communications system or the communication protocol, or the mapping relationship #B may be determined by the ingress PE and the egress PE through negotiation, or the mapping relationship #B may be input by the user or the administrator to the ingress PE and the egress PE, or the mapping relationship #B may be configured by the manufacturer or the operator in the ingress PE and the egress PE. This is not particularly limited.

It should be noted that, in this application, because the egress PE device #C needs to restore the modified code block, the restoration manner used by the egress PE device #C needs to correspond to the processing manner (that is, the processing manner 1 or the processing manner 2) used by the ingress PE device #B (for example, the restoration manner and the processing manner are mutually inverse processing), to ensure accuracy of restoration.

As an instance instead of a limitation, in this application, the processing manner used by the ingress PE device #B may be pre-specified by the communications system or the communication protocol, or the processing manner used by the ingress PE device #B may be determined by the egress PE device #C and the ingress PE device #B through negotiation, or the processing manner used by the ingress PE device #B may be determined by the management device of the transport network and delivered to the ingress PE device

B; in addition, the management device may deliver, to the egress PE device #C, the restoration manner corresponding to the modification manner.

In addition, when the ingress PE device #B performs modification in the foregoing manner 3, the egress PE device #C may modify the S code block meeting the condition 1 to the 0x33 code block, and modify the T code block meeting the condition 2 to the 0x66 code block.

Alternatively, when the ingress PE device #B performs modification in the foregoing manner 4, the egress PE device #C may modify the S code block meeting the condition 1 to the 0x66 code block, and modify the T code block meeting the condition 2 to the 0x33 code block.

It should be noted that, in this application, because the egress PE device #C needs to restore the modified code block, the restoration manner used by the egress PE device #C needs to correspond to the modification manner used by the ingress PE device #B (for example, the restoration manner and the modification manner are mutually inverse processing), to ensure accuracy of restoration.

As an instance instead of a limitation, in this application, the modification manner used by the ingress PE device #B may be pre-specified by the communications system or the communication protocol, or the modification manner used by the ingress PE device #B may be determined by the egress PE device #C and the ingress PE device #B through negotiation, or the modification manner used by the ingress PE device #B may be determined by the management device of the transport network and delivered to the ingress PE device #B; in addition, the management device may deliver, to the egress PE device #C, the restoration manner corresponding to the modification manner.

In S260, the egress PE device #C may transmit a signal (denoted as an Ethernet signal #C) generated by the foregoing restoration processing to a client device #D. Therefore, the client device #D can obtain, based on the Ethernet signal #C, various information carried in the Ethernet signal #A.

According to the solution provided by this application, the transmitting device may modify a code block of a start type in a middle or low rate mode to a code block that can be recognized by the transport network; and the end device may recognize the modified code block based on information carried in a payload field of the modified code block or a code block type of a code block after the code block. This not only can ensure that the code block of the start type in the middle or low rate mode can be transmitted by the transport network, but also can ensure that the receiving device reliably recognizes the modified code block, and further, accuracy of communication can be improved.

According to the solution provided by this application, a process of converting an S code block from a middle or low rate Ethernet signal to a high rate Ethernet signal can be completed without losing information. Therefore, full transparency of a codeword can be implemented, and information in an original code block stream is not lost.

In addition, the foregoing code block conversion process is 1:1 transcoding, without requiring additional bit overheads, causing bandwidth expansion, or causing a waste of transmission resources. Therefore, 5 GE occupies only one 5G slot of the FlexE, 10 GE occupies only two 5G slots of the FlexE, and 25 GE occupies only five 5G slots of the FlexE.

According to the solution provided by this application, a PCS layer coding specification of existing 100 GBASE-R can be fully complied with, and a standard code block processing mechanism (for example, an adjustment mechanism based on an idle code block) is not affected.

According to the solution provided by this application, an Ethernet signal (that is, the middle or low rate Ethernet signal) from the client device may be transmitted in a codeword transparency (codeword transparent) manner in the transport network. The codeword is a combination of a group of several binary codes. Codeword transparency means that the transport network carrying and transmitting a client signal of a user does not lose or tamper with information of any codeword in a data stream of the client signal of the user when transmitting the data stream carrying this type of codeword.

Figure 14:
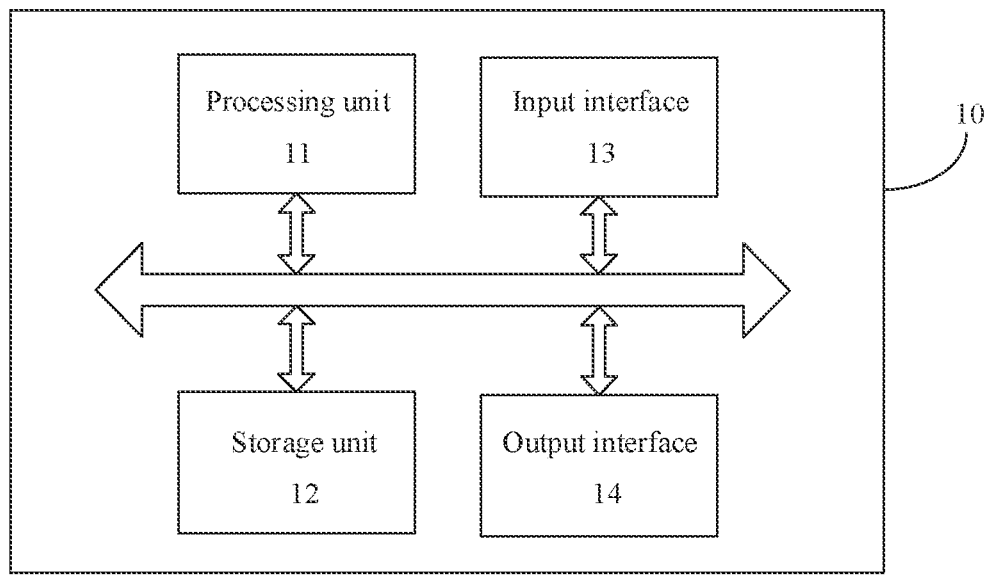
FIG. 14 is a schematic diagram of an apparatus for transmitting a code block stream according to an embodiment of this application.

According to the foregoing method, FIG. 14 is a schematic diagram of a communications apparatus 10 according to an embodiment of this application. As shown in FIG. 14, the apparatus 10 may be an ingress transport device (that is, a receiving device, for example, an egress PE device), or may be a chip or a circuit, for example, a chip or a circuit that may be disposed in an ingress transport device.

The communications apparatus 10 may include a processing unit 11 (that is, an example of a processing unit) and a storage unit 12. The storage unit 12 is configured to store an instruction, and the processing unit 11 is configured to execute the instruction stored in the storage unit 12, so that the communications apparatus 10 implements the step performed by the transport device (that is, the receiving device, for example, the egress PE device #C) in the foregoing method.

Further, the apparatus 10 may further include an input interface 13 (that is, an example of a communications unit) and an output interface 14 (that is, another example of a communications unit). Further, the processing unit 11, the storage unit 12, the input interface 13, and the output interface 14 may communicate with each other by using an internal connection path, and transmit a control and/or data signal. The storage unit 12 is configured to store a computer program, and the processing unit 11 may be configured to invoke and run the computer program in the storage unit 12, to control the input interface 13 to receive a signal, and control the output interface 14 to transmit a signal, to complete the step of the terminal device in the foregoing method. The storage unit 12 may be integrated in the processing unit 11, or may be disposed separately from the processing unit 11.

Optionally, if the communications apparatus 10 is a transport device, the input interface 13 is a receiver, and the output interface 14 is a transmitter. The receiver and the transmitter may be a same physical entity or different physical entities. When the receiver and the transmitter are the same physical entity, they may be collectively referred to as a transceiver.

Optionally, if the communications apparatus 10 is a chip or a circuit, the input interface 13 is an input interface, and the output interface 14 is an output interface.

In an implementation, it may be considered that functions of the input interface 13 and the output interface 14 are implemented by a transceiver circuit or a dedicated transceiver chip. It may be considered that the processing unit 11 may be implemented by a dedicated processing chip, a processing circuit, a processing unit, or a general purpose chip.

In another implementation, it may be considered that the receiving device provided by this embodiment of this application is implemented by using a general purpose computer. To be specific, program code for implementing functions of the processing unit 11, the input interface 13, and the output interface 14 is stored in the storage unit 12. A general purpose processing unit implements the functions of the processing unit 11, the input interface 13, and the output interface 14 by executing the code in the storage unit 12.

In an implementation, the processing unit 11 is configured to determine a target code block in a code block stream that is in a first rate mode and includes a plurality of code blocks, where the target code block includes a code block of a start type in the first rate mode, and configured to modify the target code block, to modify information carried in a code block type field of the target code block to target information, where the target information includes information carried in a code block type field of a code block of a start type in a second rate mode, or the target information includes information carried in a code block type field of a code block of a terminate type in a second rate mode; and the output interface 14 is configured to transmit a code block stream in the second rate mode to a transport network, where the code block stream in the second rate mode includes a modified target code block, and a rate of the second rate mode is greater than a rate of the first rate mode.

Optionally, the processing unit 11 is configured to add first information to bits located in a first position in a payload field of the target code block, where the first information is different from second information, and the second information is information carried in bits located in the first position in a payload field of the code block of the start type in the second rate mode.

Optionally, the bits located in the first position include a $38^{th}$ bit to a $41^{st}$ bit.

Optionally, the first rate mode includes code blocks of at least two start types; and the processing unit 11 is configured to modify information carried in a code block type field of a target start type in the first rate mode to target first information based on a mapping relationship, where the mapping relationship is used to indicate a one-to-one mapping relationship between the at least two start types and at least two types of first information, the target start type corresponds to the target first information, and the target start type is any one of the at least two start types.

Optionally, information carried in a code block type field of the code block of the start type in the first rate mode includes 0x33 or 0x66.

Optionally, the information carried in the code block type field of the code block of the start type in the second rate mode includes 0x78.

Optionally, the target information includes information 0xFF carried in the code block type field of the code block of the terminate type in the second rate mode.

Optionally, the first rate mode includes at least one of a 5 gigabits per second Gbps mode, a 10 Gbps mode, and a 25 Gbps mode.

Optionally, the second rate mode includes at least one of a 40 Gbps mode, a 100 Gbps mode, a 200 Gbps mode, or a 400 Gbps mode.

Optionally, the code block includes a 64-bit/66-bit code block.

Optionally, the code block includes a physical coding sublayer PCS code block.

Optionally, the transport network includes a flexible Ethernet FlexE network.

Functions and actions of each module or unit in the illustrated apparatus 10 are examples for description only. Each module or unit in the apparatus 10 may be configured to perform each action or process performed by the transport device (for example, the ingress PE device #B) in the foregoing method. Herein to avoid repetition, a detailed description thereof is omitted.

For concepts, explanations, and detailed descriptions related to the technical solution provided by this embodiment of this application in the apparatus 10, and other steps, refer to descriptions about the content in the foregoing method or other embodiments. Details are not described again herein.

According to the solution provided by this application, a transmitting device may modify a code block of a start type in a middle or low rate mode to a code block that can be recognized by the transport network; and the end device may recognize the modified code block based on information carried in a payload field of the modified code block or a code block type of a code block after the code block. This not only can ensure that the code block of the start type in the middle or low rate mode can be transmitted by the transport network, but also can ensure that the receiving device reliably recognizes the modified code block, and further, accuracy of communication can be improved.

Figure 15:
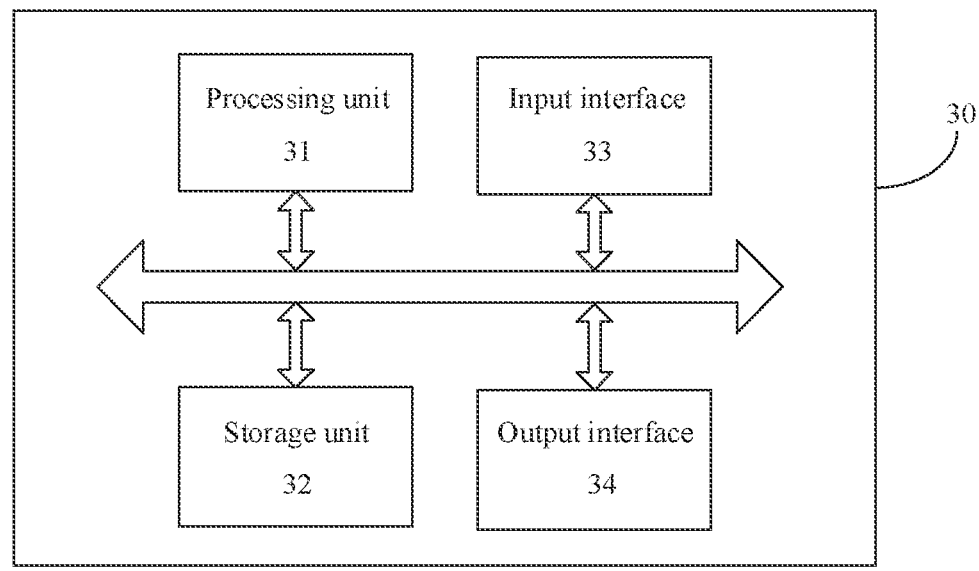
FIG. 15 is a schematic diagram of an apparatus for receiving a code block stream according to an embodiment of this application.

According to the foregoing method, FIG. 15 is a schematic diagram of a communications apparatus 30 according to an embodiment of this application. As shown in FIG. 15, the apparatus 30 may be a transport device (that is, a transmitting device, for example, an egress PE device #C), or may be a chip or a circuit, for example, a chip or a circuit that may be disposed in a network device.

The apparatus 30 may include a processing unit 31 and a storage unit 32. The storage unit 32 is configured to store an instruction, and the processing unit 31 is configured to execute the instruction stored in the storage unit 32, so that the apparatus 30 implements the step performed by the transmitting device in the foregoing method.

Further, the apparatus 30 may further include an input interface 33 (that is, an example of a communications unit) and an output interface 33 (that is, another example of a processing unit).

Further, the processing unit 31, the storage unit 32, the input interface 33, and the output interface 34 may communicate with each other by using an internal connection path, and transmit a control and/or data signal.

In addition, it may be considered that the network device provided by this embodiment of this application is implemented by using a general purpose computer. To be specific, program code for implementing functions of the processing unit 31, the input interface 33, and the output interface 34 is stored in the storage unit. A general purpose processing unit implements the functions of the processing unit 31, the input interface 33, and the output interface 34 by executing the code in the storage unit.

The storage unit 32 is configured to store a computer program.

In an implementation, the input interface 33 is configured to receive, from a transport network, a code block stream that is in a second rate mode and includes a plurality of code blocks; and the processing unit 31 is configured to determine a target code block in the code block stream in the second rate mode, where the target code block includes a first target code block, the first target code block is a code block of a start type, and information carried in a payload field of the first target code block is different from preamble information in the second rate mode, and/or the target code block includes a second target code block, the second target code block is a code block of a terminate type, and a code block after the second target code block in the code block stream in the second rate mode is a code block of a data type; and configured to modify the target code block, to modify the target code block to a code block of a start type in a first rate mode, where a rate of the second rate mode is greater than a rate of the first rate mode.

Optionally, first information is different from second information, the first information is information carried in bits located in a first position in a payload field of the target code block, and the second information is information carried in bits located in the first position in a payload field of a code block of a start type in the second rate mode.

Optionally, the bits located in the first position include a $38^{th}$ bit to a $41^{st}$ bit.

Optionally, the first rate mode includes code blocks of at least two start types; and the processing unit 31 is configured to modify, based on a mapping relationship, the target code block to a code block of a target start type in the at least two start types, where the mapping relationship is used to indicate a one-to-one mapping relationship between the at least two start types and at least two types of first information, the target start type corresponds to target first information, and the target first information is the information carried in the bits located in the first position in the payload field of the target code block.

Optionally, information carried in a code block type field of the code block of the start type in the first rate mode includes 0x33 and/or 0x66.

Optionally, information carried in a code block type field of the code block of the start type in the second rate mode includes 0x78.

Optionally, the target information includes information 0xFF carried in a code block type field of the code block of the terminate type in the second rate mode.

Optionally, the first rate mode includes at least one of a 5 gigabits per second Gbps mode, a 10 Gbps mode, and a 25 Gbps mode.

Optionally, the second rate mode includes at least one of a 40 Gbps mode, a 100 Gbps mode, a 200 Gbps mode, or a 400 Gbps mode.

Optionally, the code block includes a 64-bit/66-bit code block.

Optionally, the code block includes a physical coding sublayer PCS code block.

Optionally, the transport network includes a flexible Ethernet FlexE network.

Functions and actions of each module or unit in the illustrated apparatus 30 are examples for description only. Each module or unit in the apparatus 30 may be configured to perform each action or process performed by the transport device (that is, the transmitting device, for example, the ingress PE device #B) in the foregoing method. Herein to avoid repetition, a detailed description thereof is omitted.

For concepts, explanations, and detailed descriptions related to the technical solution provided by this embodiment of this application in the apparatus 30, and other steps, refer to descriptions about the content in the foregoing method or other embodiments. Details are not described again herein.

Because a code block of an ordered set type is transmitted in an inter packet gap, the transmitting device may modify the code block of the ordered set type to a code block of a data type or a code block of a terminate type that can be recognized by the transport network. Therefore, the receiving device can determine that the code block of the data type or the code block of the terminate type in the inter packet gap is generated by modification based on the code block of the ordered set type, and may further modify the code block of the data type or the code block of the terminate type in the inter packet gap back to the code block of the ordered set type. Therefore, it can be ensured that the code block of the ordered set type can be transmitted by using the transport network, and it can also be ensured that the receiving device reliably recognizes the code block of the ordered set type, and further accuracy of communication can be improved.

Figure 16:
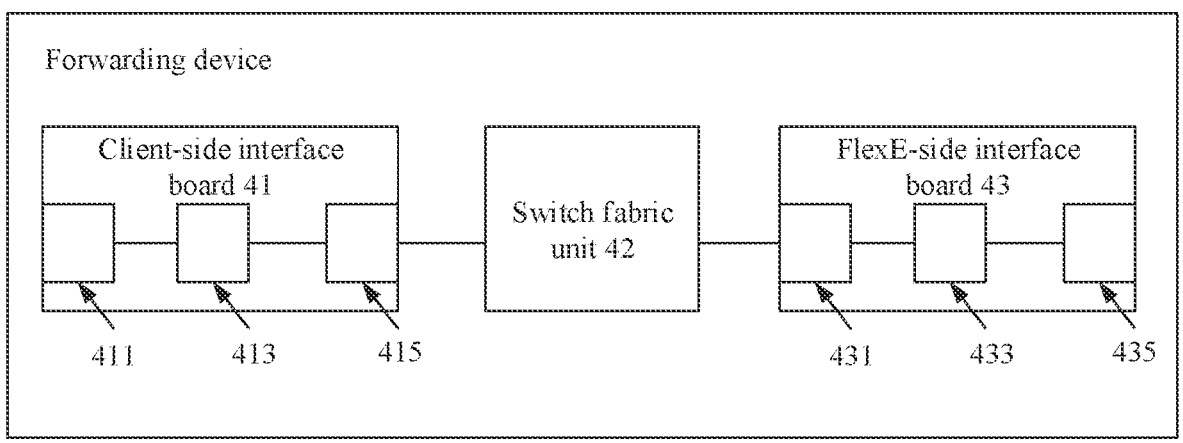
FIG. 16 is a schematic structural diagram of an example of a transport device according to an embodiment of this application.

FIG. 16 is a schematic block diagram of an example of a transport device (for example, an ingress transport device or an egress transport device) according to this application.

As shown in FIG. 16, the transport device includes one or more client-side interface boards 41, a switch fabric unit 42, and one or more FlexE-side interface boards 43.

The client-side interface board 41 includes an external interface 411, a transcoder 413, and an internal interface 415.

In addition, the FlexE-side interface board 43 includes an internal interface 431, a transcoder 433, and an external interface 435.

When the transport device is used as an ingress PE device, the external interface 411 is configured to receive a low rate Ethernet signal (for example, a signal whose rate is 5 Gps, 10 Gps, or 25 Gps) from a client device.

The transcoder 413 is configured to convert the low rate Ethernet signal into a high rate Ethernet signal (for example, a signal whose rate is 40 Gps, 100 Gps, 200 Gps, or 400 Gps). Specifically, the transcoder 413 is configured to convert a code block in a PCS layer code block stream of the middle or low rate Ethernet signal into a code block stream meeting a PCS layer transmission requirement of the high rate Ethernet signal.

The internal interface 145 is configured to transmit the high rate Ethernet signal to the switch fabric unit 42.

The switch fabric unit 42 is configured to forward, based on a preset routing rule, the high rate Ethernet signal to the FlexE-side interface board 43 that can route the high rate Ethernet signal to an egress transport device.

The internal interface 431 is configured to receive the high rate Ethernet signal from the switch fabric unit 42.

The external interface 435 is configured to transmit the high rate Ethernet signal to a transport network, for example, a FlexE network.

When the transport device is used as an egress PE device, the external interface 435 is configured to receive a high rate Ethernet signal (for example, a signal whose rate is 40 Gps, 100 Gps, 200 Gps or 400 Gps) from a transport network, for example, a FlexE network.

The transcoder 433 is configured to convert the high rate Ethernet signal into a middle or low rate Ethernet signal (for example, a signal whose rate is 5 Gps, 10 Gps, or 25 Gps). Specifically, the transcoder 433 is configured to convert a code block in a PCS layer code block stream of the high or low rate Ethernet signal into a code block stream meeting a PCS layer transmission requirement of the middle or low rate Ethernet signal.

The internal interface 431 is configured to transmit the middle or low rate Ethernet signal to the switch fabric unit 42.

The switch fabric unit 42 is configured to forward, based on a preset routing rule, the middle or low rate Ethernet signal to the client-side interface board 41 that can route the middle or low rate Ethernet signal to a destination client device.

The internal interface 415 is configured to receive the middle or low rate Ethernet signal from the switch fabric unit 42.

The external interface 411 is configured to transmit the middle or low rate Ethernet signal to the destination client device.

When the transport device serves as an ingress PE device, an action of the client-side interface board 41 (specifically, each module or unit in the client-side interface board 41) may correspond to an action of the input interface 13, and an action of the transcoder 413 may correspond to an action of the processing unit 11. Herein to avoid repetition, a detailed description thereof is omitted.

In addition, when the transport device serves as an egress PE device, an action of the FlexE-side interface board 43 (specifically, each module or unit in the FlexE-side interface board 43) may correspond to an action of the output interface 34, and an action of the transcoder 433 may correspond to an action of the processing unit 31. Herein to avoid repetition, a detailed description thereof is omitted.

In this application, a code block in the PCS layer code block stream of the Ethernet signal may include a 64-bit/66-bit code block.

As an example instead of a limitation, a code block of an ordered set type in the PCS layer code block stream of the middle or low rate Ethernet signal includes a code block whose information carried in a code block type field is 0x33 or 0x66.

In this application, the forwarder (in-flow, the transcoder 413 or the transcoder 433) may be implemented by a processor. The processor is mainly configured to process a communication protocol and communication data, control the entire transport device, execute a software program, and process data of the software program, for example, configured to support the transport device in performing actions described in the foregoing method embodiment. A memory is mainly configured to store the software program and data.

After the terminal device is powered on, the processor may read the software program in the storage unit, interpret and execute an instruction of the software program, and process the data of the software program.

For example, the processor may include a baseband processor and a central processing unit. The baseband processor is mainly configured to process the communication protocol and the communication data, and the central processing unit is mainly configured to control the entire terminal device, execute the software program and process the data of the software program. A person skilled in the art may understand that, the baseband processor and the central processing unit may also be independent processors, and are interconnected by using a technology such as a bus. A person skilled in the art may understand that, the terminal device may include a plurality of baseband processors to adapt to different network standards. The terminal device may include a plurality of central processing units to enhance processing capabilities of the terminal device. The parts of the terminal device may be connected by using various buses. The baseband processor may also be expressed as a baseband processing circuit or a baseband processing chip. The central processing unit may also be expressed as a central processing circuit or a central processing chip. Functions for processing the communication protocol and the communication data may be built in the processor, or may be stored in the storage unit in a form of a software program. The processor executes the software program to implement a baseband processing function.

It should be understood that, the processor in the embodiments of this application may be a central processing unit (CPU), or may further be another general purpose processor, a digital signal processor (DSP), an application specific integrated circuit (ASIC), a field programmable gate array (FPGA), or another programmable logical device, discrete gate or transistor logical device, discrete hardware component, or the like. The general purpose processor may be a microprocessor, or the processor may be any conventional processor or the like.

It may be understood that the memory in the embodiments of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through example but not limitative description, many forms of random access memories (RAM) may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM).

All or some of the foregoing embodiments may be implemented by software, hardware, firmware, or any combination thereof. When software is used to implement the embodiments, the foregoing embodiments may be implemented completely or partially in a form of a computer program product. The computer program product includes one or more computer instructions or computer programs. When the program instructions or the computer programs are loaded and executed on a computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application. It may be clearly understood by a person skilled in the art that, for the purpose of convenient and brief description, for a detailed working process of the foregoing system, apparatus, and unit, refer to a corresponding process in the foregoing method embodiments, and details are not described herein again. In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments. In addition, functional units in the embodiments of this application may be integrated into one processing unit, or each of the units may exist alone physically, or two or more units are integrated into one unit. When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a removable hard disk, a read-only memory, a random access memory, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method comprising:
    determining, by a transmitting device, a target code block in a first code block stream that is in a first rate mode and comprises a plurality of code blocks, wherein the target code block is a code block of a first start type in the first rate mode;
    modifying, by the transmitting device, information carried in a code block type field of the target code block to target information to obtain a modified target code block, wherein
    the target information comprises information carried in a code block type field of a code block of a second start type in a second rate mode, or the target information comprises information carried in a code block type field of a code block of a terminate type in the second rate mode; and
    transmitting, by the transmitting device, a second code block stream in the second rate mode to a transport network, wherein the second code block stream in the second rate mode comprises the modified target code block.

2. The method according to claim 1, wherein the method further comprises:
    adding, by the transmitting device, first information to bits located in a first position in a first payload field of the target code block, wherein the first information is different from second information, and the second information is information carried in bits located in the first position in a second payload field of the code block of the second start type in the second rate mode.

3. The method according to claim 2, wherein the bits located in the first position comprise a $38^{th}$ bit to a $41^{st}$ bit.

4. The method according to claim 2, wherein the first rate mode comprises at least two start types of code blocks; and
    adding the first information to the bits located in the first position in the first payload field of the target code block comprises:
    modifying, by the transmitting device, information carried in a code block type field of a target start type in the first rate mode to target first information based on a mapping relationship, wherein the mapping relationship indicates a one-to-one mapping relationship between the at least two start types and at least two types of the first information, the target start type corresponds to the target first information, and the target start type is one of the at least two start types.

5. The method according to claim 1, wherein the information carried in the code block type field of the target code block of the first start type in the first rate mode comprises 0x33 or 0x66.

6. The method according to claim 1, wherein the information carried in the code block type field of the code block of the second start type in the second rate mode comprises 0x78; or
    the information carried in the code block type field of the code block of the terminate type in the second rate mode comprises 0xFF.

7. The method according to claim 1, wherein the first rate mode comprises at least one of a 5 Gbps mode, a 10 Gbps mode, or a 25 Gbps mode; and
    the second rate mode comprises at least one of a 40 Gbps mode, a 100 Gbps mode, a 200 Gbps mode, or a 400 Gbps mode.

8. The method according to claim 1, wherein the code block of the first start type, the code block of the second start type, or the code block of the terminate type comprises a 64-bit code block or a 66-bit code block.

9. The method according to claim 1, wherein the code block of the first start type, the code block of the second start type, or the code block of the terminate type comprises a physical coding sublayer (PCS) code block.

10. The method according to claim 1, wherein the transport network comprises a flexible Ethernet (FlexE) network.

11. A method comprising:
receiving, by a receiving device from a transport network, a code block stream that is in a second rate mode and comprises a plurality of code blocks;
determining, by the receiving device, a target code block in the code block stream in the second rate mode, wherein
the target code block comprises a first target code block of a first start type in the second rate mode, and information carried in a payload field of the first target code block is different from preamble information in the second rate mode, or
the target code block comprises a second target code block of a terminate type in the second rate mode, and a code block after the second target code block in the code block stream in the second rate mode is a code block of a data type; and
modifying, by the receiving device, the target code block to a code block of a second start type in a first rate mode.

12. The method according to claim 11, wherein the target code block comprises first information that is different from second information, the first information is information carried in bits located in a first position in a payload field of the target code block, and the second information is information carried in bits located in the first position in a payload field of a code block of the first start type in the second rate mode.

13. The method according to claim 12, wherein the bits located in the first position comprise a $38^{th}$ bit to a $41^{st}$ bit.

14. The method according to claim 12, wherein the first rate mode comprises at least two start types of code blocks; and
modifying, by the receiving device, the target code block comprises:
modifying, by the receiving device based on a mapping relationship, the target code block to a code block of a target start type in the at least two start types, wherein the mapping relationship indicates a one-to-one mapping relationship between the at least two start types and at least two types of first information, the target start type corresponds to target first information, and the target first information is the information carried in the bits located in the first position in the payload field of the target code block.

15. The method according to claim 11, wherein information carried in a code block type field of the code block of the second start type in the first rate mode comprises 0x33 or 0x66.

16. The method according to claim 11, wherein information carried in a code block type field of the first target code block of the first start type in the second rate mode comprises 0x78; or
information carried in a code block type field of the second target code block of the terminate type comprises 0xFF.

17. The method according to claim 11, wherein the first rate mode comprises at least one of a 5 Gbps mode, a 10 Gbps mode, or a 25 Gbps mode; and
the second rate mode comprises at least one of a 40 Gbps mode, a 100 Gbps mode, a 200 Gbps mode, or a 400 Gbps mode.

18. The method according to claim 11, wherein the code block of the second start type comprises a 64-bit or 66-bit code block.

19. The method according to claim 11, wherein the target code block or the code block of the second start type comprises a physical coding sublayer (PCS) code block.

20. An apparatus comprising:
a non-transitory memory storage comprising instructions; and
one or more processors in communication with the memory storage, wherein the instructions, when executed by the one or more processors, cause the apparatus to:
determine a target code block in a code block stream that is in a first rate mode and that comprises a plurality of code blocks, wherein the target code block comprises a code block of a first start type in the first rate mode; and
modify the target code block, to modify information carried in a code block type field of the target code block to target information to obtain a modified target code block, wherein the target information comprises information carried in a code block type field of a code block of a second start type in a second rate mode, or the target information comprises information carried in a code block type field of a code block of a terminate type in the second rate mode; and
transmit a second code block stream in the second rate mode to a transport network, wherein the second code block stream in the second rate mode comprises the modified target code block.

* * * * *